US012249030B2

(12) United States Patent
Sminchisescu et al.

(10) Patent No.: US 12,249,030 B2
(45) Date of Patent: Mar. 11, 2025

(54) GENERATIVE NONLINEAR HUMAN SHAPE MODELS

(71) Applicant: Google LLC, Mountain View, CA (US)

(72) Inventors: Cristian Sminchisescu, Kanton of Zurich (CH); Hongyi Xu, Kanton of Zurich (CH); Eduard Gabriel Bazavan, Kanton of Zurich (CH); Andrei Zanfir, Kanton of Zurich (CH); William T. Freeman, Acton, MA (US); Rahul Sukthankar, Orlando, FL (US)

(73) Assignee: GOOGLE LLC, Mountain View, CA (US)

( * ) Notice: Subject to any disclaimer, the term of this patent is extended or adjusted under 35 U.S.C. 154(b) by 148 days.

(21) Appl. No.: 17/922,160

(22) PCT Filed: Apr. 30, 2020

(86) PCT No.: PCT/US2020/030712
§ 371 (c)(1),
(2) Date: Oct. 28, 2022

(87) PCT Pub. No.: WO2021/221657
PCT Pub. Date: Nov. 4, 2021

(65) Prior Publication Data
US 2023/0169727 A1 Jun. 1, 2023

(51) Int. Cl.
*G06T 17/20* (2006.01)
*G06N 3/0455* (2023.01)
(Continued)

(52) U.S. Cl.
CPC ........... *G06T 17/20* (2013.01); *G06N 3/0455* (2023.01); *G06N 3/08* (2013.01); *G06T 19/20* (2013.01); *G06T 2219/2021* (2013.01)

(58) Field of Classification Search
CPC . G06T 17/20; G06T 19/20; G06T 2219/2021; G06T 17/00; G06T 7/70;
(Continued)

(56) References Cited

U.S. PATENT DOCUMENTS

2018/0130245 A1\* 5/2018 Kozlov .................. G06T 13/40
2019/0043269 A1\* 2/2019 Lin ........................... G06T 7/62
(Continued)

OTHER PUBLICATIONS

Madadi et al; "SMPLR: Deep SMPL reverse for 30 human pose and shape recovery", arxiv.org, Dec. 27, 2018, XP081457828 (Year: 2018).\*
(Continued)

*Primary Examiner* — Michael Le
(74) *Attorney, Agent, or Firm* — DORITY & MANNING P.A.

(57) ABSTRACT

The present disclosure provides a statistical, articulated 3D human shape modeling pipeline within a fully trainable, modular, deep learning framework. In particular, aspects of the present disclosure are directed to a machine-learned 3D human shape model with at least facial and body shape components that are jointly trained end-to-end on a set of training data. Joint training of the model components (e.g., including both facial, hands, and rest of body components) enables improved consistency of synthesis between the generated face and body shapes.

20 Claims, 13 Drawing Sheets

(51) Int. Cl.
  *G06N 3/08* (2023.01)
  *G06T 19/20* (2011.01)
(58) Field of Classification Search
  CPC ........ G06T 2207/20081; G06N 3/0455; G06N 3/08; G06N 20/00; G06V 40/16
  See application file for complete search history.

(56) References Cited

U.S. PATENT DOCUMENTS

2019/0392653 A1* 12/2019 Varanasi ............... G06T 19/20
2020/0058137 A1* 2/2020 Pujades ................. G06V 40/23

OTHER PUBLICATIONS

Pavlakos et al.,"Expressive Body Capture: 3d Hands. Face, and Body from a Single Image", arXiv:1904.05866vl, Apr. 11, 2019, 22pages (Year: 2019).*
Romero et al.,"Embodied Hands: Modeling and Capturing Hands and Bodies Together", ACM Transactions on Graphics, vol. 36, No. 6, Nov. 20, 2017, pp. 1-17, XP058473836. (Year: 2017).*
Li et aL "Learning a Model of Facial Shape and Expression from 4DS cans", ACM Transactions on Graphics, vol. 36, No. 6 , Article 194, Nov. 2017, 17pages. (Year: 2017).*
Hasson et al.,"Learning Joint Reconstruction of Hands and Manipulated Objects". arxiv: 1904.05767vl, Apr. 11, 2019. 14pages (Year: 2019).*
Madadi et al.; SMPLR: Deep SMPL reverse for 3D human pose and shape recovery, arxiv.org, Dec. 27, 2018, XP081457828 (Year: 2018).*
Allen et al., "The Space of Human Body Shapes: Reconstruction and Parameterization from Range Scans", ACM Special Interest Group on Computer Graphics and Interactive Techniques, Jul. 27-31, 2003, San Diego, California, USA, 8 pages.
Amberg et al., "Expression Invariant 3D Face Recognition with a Morphable Model", International Conference on Automatic Face & Gesture Recognition, Sep. 17-19, 2008, 6 pages.
Anguelov et al., "Scape: Shape Completion and Animation of People", ACM Transactions on Graphics, Jul. 2005, 9 pages.
Benzine et al., "Deep, Robust and Single Shot 3D Multi-Person Human Pose Estimation from Monocular Images", arXiv:1911.03391v2, Jan. 7, 2021, 32 pages.
Bogo et al., "Keep it SMPL: Automatic Estimation of 3D Human Pose and Shape from a Single Image", arXiv:1607.08128v1, Jul. 27, 2016, 18 pages.
Brunton et al., "Comparative Analysis of Statistical Shape Space".
Cao, "Facewarehouse: A 3D Facial Expression Database for Visual Computing", Transactions on Visualization and Computer Graphics, vol. 20, No. 3, Mar. 2014, pp. 413-425.
CMU Graphics Lab Motion Capture Database, http://mocap.cs.cmu.edu/, 2009.
Fieraru et al., "Three-Dimensional Reconstruction of Human Interactions", Conference on Computer Vision and Pattern Recognition, Seattle, Washington, United States, Jun. 13-19, 2020, pp. 7214-7223.
Hasler et al., "A Statistical Model of Human Pose and Body Shape", Computer Graphics Forum, vol. 28, Issue 2, Mar. 27, 2009, pp. 337-346.
Hasson et al., "Learning Joint Reconstruction of Hands and Manipulated Objects", arXiv:1904.05767v1, Apr. 11, 2019, 14 pages.
International Preliminary Report on Patentability for PCT/US2020/030712, mailed on Nov. 10, 2022, 14 pages.
International Search Report and Written Opinion for PCT/US2020/03072, mailed on Jan. 21, 2021, 20 pages.
Ionescu et al., "Human3.6M: Large Scale Datasets and Predictive Methods for 3D Human Sensing in Natural Environments", Transactions on Pattern Analysis and Machine Intelligence, vol. 36, Dec. 11, 2013, pp. 1-15.
Jiang et al., "Skeleton-Aware 3D Human Shape Reconstruction From Point Clouds", International Conference on Computer Vision, Seoul, Korea, Oct. 27-Nov. 2, 2019, pp. 5431-5441.
Joo et al., "Total Capture: A 3D Deformation Model for Tracking Faces, Hands, and Bodies", arXiv:1801.01615v1, Jan. 5, 2018, 10 pages.
Katircioglu et al., "Learning Latent Representations of 3D Human Pose with Deep Neural Networks", International Journal of Computer Vision, vol. 126, Jan. 2018, pp. 1326-1341.
Kingma et al., "Auto-Encoding Variational Bayes", arXiv:1312.6114, May 1, 2014, 14 pages.
Kolotouros et al., "Learning to Reconstruct 3D Human Pose and Shape Via Model-Fitting in the Loop", arXiv:1909.12828v1, Sep. 27, 2019, 10 pages.
Li et al., "Crowdpose: Efficient Crowded Scenes Pose Estimation and a New Benchmark", arXiv:1812.00324v2, Jan. 23, 2019, 9 pages.
Li et al., "LBS Autoencoder: Self-Supervised Fitting of Articulated Meshes to Point Clouds", arXiv:1904.10037v1, Apr. 22, 2019, 10 pages.
Li et al., "Learning a Model of Facial Shape and Expression from 4D Scans", ACM Transactions on Graphics, vol. 36, No. 6, Article 194, Nov. 2017, 17 pages.
Lin et al., "Microsoft COCO: Common Objects in Context", arXiv:1405.0312v3, Feb. 21, 2015, 15 pages.
Liu et al., "Markerless Motion Capture of Interacting Characters Using Multi-View Image Segmentation", Computer Vision and Pattern Recognition, Colorado Springs, Colorado, United States, Jun. 20-25, 2011, pp. 1249-1256.
Loper et al., "SMPL: A Skinned Multi-Person Linear Model", ACM Transactions on Graphics, vol. 34, Issue 6, Article 248, Nov. 2015, pp. 1-16.
Luvizon et al., "2D/3D Pose Estimation and Action Recognition Using Multitask Deep Learning", arXiv:1802.09232v2, Mar. 2, 2018, 12 pages.
Madadi et al., "SMPLR: Deep SMPL Reverse for 3D Human Pose and Shape Recovery", arXiv:1812.10766v2, Aug. 8, 2019, 11 pages.
Mahmood et al., "AMASS: Archive of Motion Capture as Surface Shapes", arXiv:1904.03278v1, Apr. 5, 2019, 12 pages.
Martinez et al., "A Simple Yet Effective Baseline for 3D Human Pose Estimation", arXiv:1705.03098v2, Aug. 4, 2017, 10 pages.
Mehta et al., "Single-Shot Multi-Person 3D Pose Estimation from Monocular RGB", arXiv:1712.03453v3, Aug. 28, 2018, 16 pages.
Mehta et al., "VNect: Real-Time 3D Human Pose Estimation with a Single RGB Camera", arXiv:1705.01583v1, May 3, 2017, 13 pages.
Oberweger et al., "Training a Feedback Loop for Hand Pose Estimation", arXiv:1609.09698v1, Sep. 30, 2016, 9 pages.
Oikonomidis et al., "Efficient Model-Based 3d Tracking of Hand Articulations Using Kinect", British Machine Vision Conference, Sep. 2011, pp. 1-11.
Pavlakos et al., "Expressive Body Capture: 3d Hands, Face, and Body from a Single Image", arXiv:1904.05866v1, Apr. 11, 2019, 22 pages.
Ploumpis et al., "Combining 3D Morphable Models: A Large Scale Face-And-Head Model", Conference on Computer Vision and Pattern Recognition, Long Beach, California, United States, Mar. 11, 2019, pp. 10934-10943.
Popa et al., "Deep Multitask Architecture for Integrated 2D and 3D Human Sensing", arXiv:1701.08985v1, Jan. 31, 2017, 10 pages.
Rhodin et al., "General Automatic Human Shape and Motion Capture Using Volumetric Contour Cues", arXiv:1607.08659v2, Oct. 21, 2016, 19 pages.
Romero et al., "Embodied Hands: Modeling and Capturing Hands and Bodies Together", arXiv:2201.02610v1, Jan. 7, 2022, 19 pages.
Su et al., "Multi-Person Pose Estimation with Enhanced Channel-wise and Spatial Information", arXiv:1905.03466v1, May 9, 2019, 9 pages.
Taylor et al., "Efficient and Precise Interactive Hand Tracking Through Joint, Continuous Optimization of Pose and Correspondences", Special Interest Group on Computer Graphics and Interactive Techniques Conference, Anaheim, California, United States, Jul. 24-28, 2016, 12 pages.

(56) References Cited

OTHER PUBLICATIONS

Tzionas et al., "Capturing Hands in Action Using Discriminative Salient Points and Physics Simulation", arXiv:1506.02178v4, Mar. 7, 2016, 24 pages.

Xu et al., "GHUM & GHUML: Generative 3D Human Shape and Articulated Pose Models", Conference on Computer Vision and Pattern Recognition, Seattle, Washington, United States, Jun. 13-19, 2020, pp. 6184-6193.

Yang et al., "3D Human Pose Estimation in the Wild by Adversarial Learning", arXiv:1803.09722v2, Apr. 16, 2018, 10 pages.

Yang et al., "Expression Flow for 3D-Aware Face Component Transfer", Graphics, vol. 30, Issue 4., Article No. 60, 10 pages.

Yoshiyasu et al., "As-Conformal-As-Possible Surface Registration", Computer Graphics Forum, vol. 33, No. 5, Jul. 9, 2014, 11 pages.

Zanfir et al., "Deep Network for the Integrated 3D Sensing of Multiple People in Natural Images", Conference on Neural Information Processing Systems, Montreal, Quebec, Canada, Dec. 3-8, 2018, 10 pages.

Zanfir et al., "Monocular 3D Pose and Shape Estimation of Multiple People in Natural Scenes—The Importance of Multiple Scene Constraints", Conference on Computer Vision and Pattern Recognition, Salt Lake City, Utah, United States, Jun. 18-22, 2018, 10 pages.

Zanfir et al., "Weakly Supervised 3d Human Pose and Shape Reconstruction with Normalizing Flows", arXiv:2003.10350v2, Aug. 22, 2020, 20 pages.

\* cited by examiner

GENERATIVE NONLINEAR HUMAN SHAPE MODELS

PRIORITY CLAIM

This application is based upon and claims the right of priority under 35 U.S.C. § 371 to International Application No. PCT/US2020/030712 filed on Apr. 30, 2020, which is incorporated by reference herein.

FIELD

The present disclosure relates generally to a three-dimensional (3D) human shape modeling pipeline. More particularly, the present disclosure relates to systems and methods that include or use a machine-learned three-dimensional human shape model with at least facial and body shape components that have been jointly trained end-to-end.

BACKGROUND

Human motion, action, and expression are of central practical importance to various fields of technology and are subject to continuous focus. As examples, creative capture in images and video, immersive photography, and physical 3D space reasoning are all fields of technology that serve to benefit from improved modeling of the human body. Consequently, models that can accurately represent the full body detail at the level of pose, shape, facial expression, and/or hand manipulation are essential in order to capture and deeply analyze those subtle interactions that can only be fully understood in 3D.

While considerable progress has been made in localizing human stick figures in images and video, and—under certain conditions—lifting to equivalent 3D skeletons and basic shapes, the general quest for reconstructing accurate models of the human body at the level of semantically meaningful surfaces, grounded in a 3D physical space, is still an area undergoing significant innovation.

The potential for model construction advances, at least in the medium term, appears to be at the incidence between intuitive physical and semantic human modeling, and large-scale capture datasets. While many interesting and powerful models for faces, hands and bodies have been constructed over time, most—if not all—were built in isolation rather than in the context of a full human body. Hence, inevitably, they did not take advantage of the large scale data analysis and model construction process that recently emerged in the context of deep learning.

As examples, a number of recent full body models like Adam, Frank, or SMPL-X, combine legacy components for face, body and hands, but usually focus on constructing a consistent, joint parameterization with proper scaling on top of already learnt components. This makes it difficult to take full advantage of the structure in all data simultaneously, experiment with alternative representations for components or different losses, assess end impact, and innovate.

SUMMARY

Aspects and advantages of embodiments of the present disclosure will be set forth in part in the following description, or can be learned from the description, or can be learned through practice of the embodiments.

One example aspect of the present disclosure is directed to a computing system featuring a machine-learned three-dimensional human shape model with at least facial and body shape components jointly trained end-to-end. The computing system includes one or more processors and one or more non-transitory computer-readable media that collectively store a machine-learned three-dimensional human shape model. The machine-learned three-dimensional human shape model includes a machine-learned facial expression decoder model trained to process a facial expression embedding associated with a human body to generate facial expression data for the human body. The machine-learned three-dimensional human shape model includes a machine-learned pose space deformation model trained to process a set of pose parameters to generate pose-dependent shape adjustments for the human body. The machine-learned three-dimensional human shape model includes a machine-learned shape decoder model trained to process a rest shape embedding associated with the human body to generate identity-based rest shape data for the human body. The machine-learned three-dimensional human shape model is trained to generate a posed mesh for the human body based at least in part on the facial expression data, the pose-dependent shape adjustments, and the identity-based rest shape data. All of the machine-learned facial expression decoder model, the machine-learned pose space deformation model, and the machine-learned shape decoder model have been jointly trained end-to-end based at least in part on a reconstructive loss function that compares a training posed mesh generated by the machine-learned three-dimensional human shape model for a training body with one or more ground truth registered shape scans of the training body.

Another example aspect of the present disclosure is directed to a computer-implemented method to jointly train a machine-learned three-dimensional human shape model end-to-end. The method includes obtaining, by a computing system comprising one or more computing devices, one or more ground truth registered shape scans of a training body, wherein the one or more ground truth registered shape scans of the training body comprise at least a ground truth registered full body scan with an arbitrary pose and a ground truth registered facial detail scan. The method includes encoding, by the computing system using a shape encoder model, an estimated registered full body scan with a resting pose to obtain a rest shape embedding associated with the training body. The method includes decoding, by the computing system using a shape decoder model, the rest shape embedding to obtain identity-based rest shape data for the training body. The method includes encoding, by the computing system using a facial encoder model, data derived from the ground truth registered facial detail scan to obtain a facial expression embedding associated with the training body. The method includes decoding, by the computing system using a facial decoder model, the facial expression embedding to obtain facial expression data for the training body. The method includes generating, by the computing system, a training posed mesh for the training body based at least in part on the identity-based rest shape data, the facial expression data, and a set of pose parameters that correspond to the arbitrary pose. The method includes evaluating a reconstructive loss function that compares the training posed mesh generated for the training body with the ground truth registered full body scan with the arbitrary pose and the ground truth registered facial detail scan. The method includes jointly training the shape encoder model, the shape decoder model, the facial encoder model, and the facial decoder model based at least in part on the reconstructive loss.

Another example aspect of the present disclosure is directed to one or more non-transitory computer-readable media that collectively store a machine-learned three-dimensional human shape model that includes: a machine-learned facial expression decoder model trained to process a facial expression embedding associated with a human body to generate facial expression data for the human body; and a machine-learned shape decoder model trained to process a shape embedding associated with the human body to generate identity-based shape data for the human body. The machine-learned three-dimensional human shape model is trained to generate a posed mesh for the human body based at least in part on the facial expression data, a set of pose parameters, and the identity-based shape data. The machine-learned facial expression decoder model and the machine-learned shape decoder model have been jointly trained end-to-end based at least in part on a reconstructive loss function that compares a training posed mesh generated by the machine-learned three-dimensional human shape model for a training body with one or more ground truth registered shape scans of the training body.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
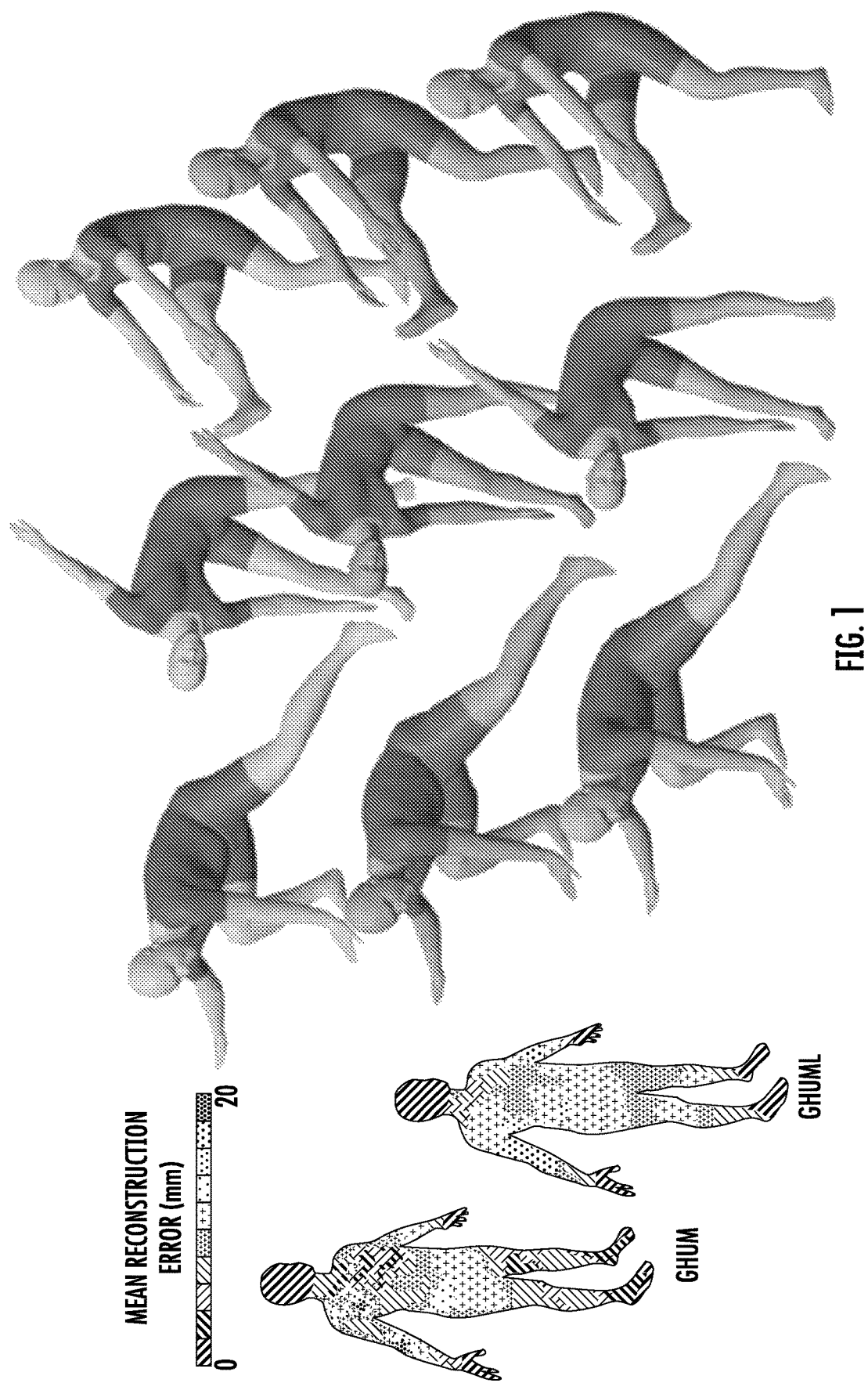
FIG. 1 depicts example evaluations of example human shape models according to example embodiments of the present disclosure.

Reference numerals that are repeated across plural figures are intended to identify the same features in various implementations.

DETAILED DESCRIPTION

1. Introduction

Generally, the present disclosure is directed to a statistical, articulated 3D human shape modeling pipeline within a fully trainable, modular, deep learning framework. In particular, aspects of the present disclosure are directed to a machine-learned 3D human shape model with at least facial and body shape components that are jointly trained end-to-end on a set of training data. Joint training of the model components (e.g., including both facial and body components) enables improved consistency of synthesis between the generated face and body shapes.

More particularly, in some implementations, a set of training data can include high-resolution complete 3D body scans of humans captured in various poses, optionally together with additional closeups of their head and facial expressions and/or hand articulation. One example training dataset can include over 34,000 diverse human configurations. In some implementations, each of these scans can be registered to one or more initial, artist designed, gender neutral rigged quad-meshes to obtain registered shape scans of a human body.

Some example machine-learned 3D human shape models described herein can include a number of sub-models or other modular components. As examples, a human shape model can include a machine-learned facial expression decoder model trained to process a facial expression embedding associated with a human body to generate facial expression data for the human body; a machine-learned pose space deformation model trained to process a set of pose parameters to generate pose-dependent shape adjustments for the human body; and/or a machine-learned shape decoder model trained to process a rest shape embedding associated with the human body to generate identity-based rest shape data for the human body. For example, in some implementations, the decoder models can be trained as a portion of a respective autoencoder (e.g., variational autoencoder) trained to receive an input shape mesh (e.g., facial mesh or body rest shape mesh) and generate the respective embeddings (e.g., facial expression embedding or rest shape embedding).

Additional example models that can be include in the machine-learned 3D human shape model can include a machine-learned joint centers prediction model trained to process the identity-based rest shape data to generate a plurality of predicted joint centers for a plurality of joints of a skeleton representation of the human body and/or a machine-learned blend skinning model trained to process the facial expression data, the pose-dependent shape adjustments, the identity-based rest shape data, and the one or more predicted joint centers to generate the posed mesh for the human body.

According to an aspect of the present disclosure, some or all of the models described above or otherwise included in the machine-learned 3D human shape model can be trained jointly end-to-end on a shared loss function. Thus, in some implementations, all model parameters including non-linear shape spaces based on variational auto-encoders, pose-space deformation correctives, skeleton joint center predictors, and/or blend skinning functions can be trained in a single consistent learning loop.

Simultaneously training all of the models on the 3D dynamic scan data (e.g., over 34,000 diverse human configurations) can improve the overall model's ability to capture correlations and ensure consistency of various components (e.g., the modeled face, body, and/or hands). Stated differently, through the use of joint training of facial, body, and/or hand components on training data that can include facial, body, and/or hand scans, the resulting models can more naturally and consistently support facial expression analysis, as well as body (with detailed hand) shape and pose estimation.

The present disclosure provides two example fully trainable gender-neutral generic human models structured and trained as described herein and having two different resolutions—the moderate-resolution GHUM consisting of 10,168 vertices and the low-resolution GHUML(ite) of 2,852 vertices. Example experimental data is also provided for these two example human models, which demonstrates improved quality and consistency with reduced error. As examples, FIG. 1 provides example evaluations of GHUM and GHUML on data from GHS3D, with heatmaps of both models to the left. The renderings show registrations of different body poses of a subject (back row), as well as GHUML and GHUM fits in the middle and front rows, respectively. Both models demonstrate good quality estimates, with lower error for GHUM.

Thus, aspects of the present disclosure are directed to an end-to-end learning pipeline for constructing full body, statistical human shape and pose models capable of actuating body shape, as well as facial expressions and/or hand motion. End-to-end pipelines and unified loss functions are provided which enable computing system to perform deep learning, allowing for the simultaneous training of all model components, including non-linear shape spaces, pose-space deformation correctives, skeleton joint center estimators, and/or blend skinning functions in the context of minimal human skeleton parameterizations with anatomical joint angle constraints. The models can be trained with high-resolution full body scans, as well as closeups of moving faces and/or hands, in order to ensure maximum detail and design consistency between body part components.

In addition, a newly collected 3D dataset of generic human shapes, GHS3D, is described and consists of over 30,000 photo-realistic dynamic human body scans. Example embodiments also use over 4,000 full body scans from Caesar. Both a moderate-resolution model, GHUM, and a specially designed (not down-sampled) low-resolution model GHUML, are provided and their relative performance is assessed for registration and constrained 3D surface fitting, under different linear and non-linear models (PCA or variational auto-encoders for body shape and facial expressions). Recovery of shape and pose from images is also illustrated.

The systems and methods described herein provide a number of technical effects and benefits. As one example technical effect, the systems and methods of the present disclosure can provide for more realistic two- or three-dimensional renderings or models of human shapes, including human shapes which have improved consistency between body, facial, and/or hand features. Specifically, model components can learn to be consistent with each other and also learn cross-domain patterns or relationships. Thus, the systems and methods of the present disclosure can enable a computing system to perform improved human modeling functionality.

As another example technical effect, by jointly training multiple model components, the total amount of training time needed to produce a human shape model can be reduced. More particularly, previous approaches separately trained facial and body components and then sought to combine them after the fact, resulting in two different training processes and then additional work to facilitate the combination, that may still be inconsistent. The proposed approach jointly trains all model components in one end-to-end process, thereby making training and the resulting models more consistent.

With reference now to the Figures, example embodiments of the present disclosure will be discussed in further detail.

2. Overview of Example Implementations

Figure 2:
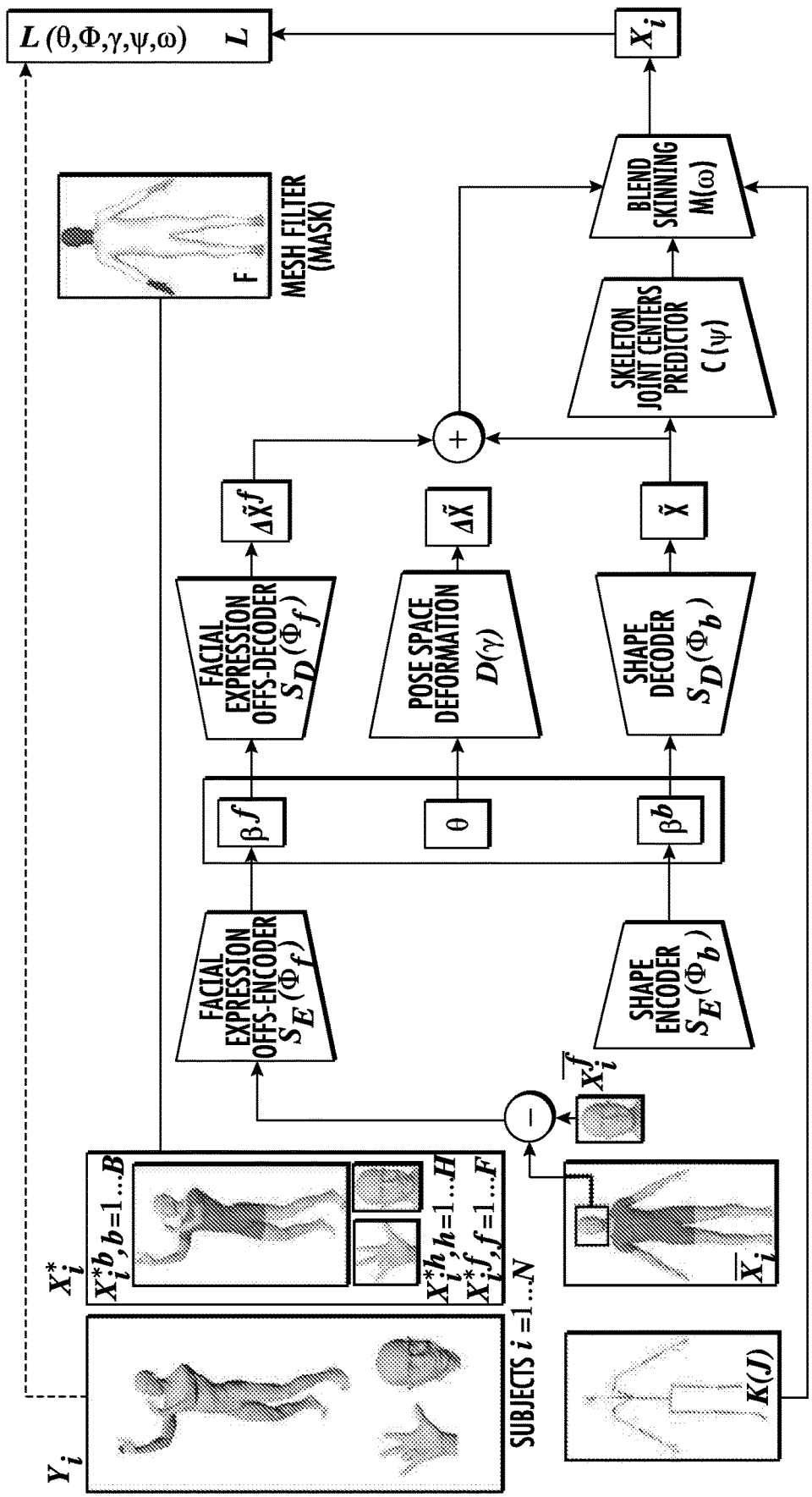
FIG. 2 depicts a block diagram of an example machine-learned human shape model according to example embodiments of the present disclosure.

Given a training set of human body scans, represented as unstructured point clouds $\{Y \in \mathbb{R}^{3P}\}$, where the number of points P varies, techniques are provided which enable a statistical human model $X(\alpha) \in \mathbb{R}^{3V}$ to be learned which represents the variability of body shapes and deforming naturally as a result of articulation. The body model X can have consistent topology with V vertices, as specified by, for example, an artist-provided (rigged) template mesh, and $\alpha$ can be a set of variables that control the body deformation as a result of both shape and articulation. As illustrated in FIG. 2, to learn a data-driven human model from scan data Y, the body template can first be registered to the point clouds in order to obtain new, registered ground truth meshes of the same topology, marked as $\{X^* \in \mathbb{R}^{3V}\}$.

The registered ground truth meshes $X^*$ can then be fed into an end-to-end training network where model parameters $\alpha$ are adjusted to produce outputs that closely match the input as a result of both articulation and shape adjustment. Various techniques can be used, including direct model parameter adjustment to the point cloud via iterative closest point (ICP) losses (identical to the ones used for registration) or with alignment to the proxy meshes $X^*$. Having as targets input meshes $X^*$ of the same model topology, makes the process considerably faster and the training losses better behaved.

Thus, FIG. 2 illustrates an overview of an example end-to-end statistical 3D articulated human shape model construction. The training input can include a set of high-resolution 3D body scans including both resting (or 'A') pose and arbitrary poses exposing a variety of articulation and soft tissue deformations. Additionally, head closeup scans of detailed facial expressions and/or hand closeup scans to capture different gestures and object grabs can be collected. These scans are shown generally at Y.

Body landmarks can be automatically identified by rendering the photorealistic 3D reconstructions of the data (e.g., obtained using multi-view stereo triangulation techniques) from multiple virtual viewpoints (e.g., which may be different from the original set of cameras used for collecting the data), detecting those landmarks in the generated images and triangulating the landmark detections in images in order to obtain their corresponding 3d reconstruction. An artist designed full body articulated mesh can be progressively registered to point clouds using losses that combine sparse landmark correspondences and dense iterative closest point (ICP) residuals (e.g., implemented as point scan to mesh facet distances), under as conformal as possible surface priors. The registered ground truth shape scans are shown generally at X.

The example human shape model illustrated in FIG. 2 can have non-linear shape spaces implemented as deep variational auto-encoders (VAEs) for the body $\phi_b$, and offset VAEs for the facial expressions $\phi_f$. The example human shape model also includes trainable pose-space deformation functions D, modulated by a skeleton K with J joints, centers predictor C, and blend skinning functions M.

Figure 3:
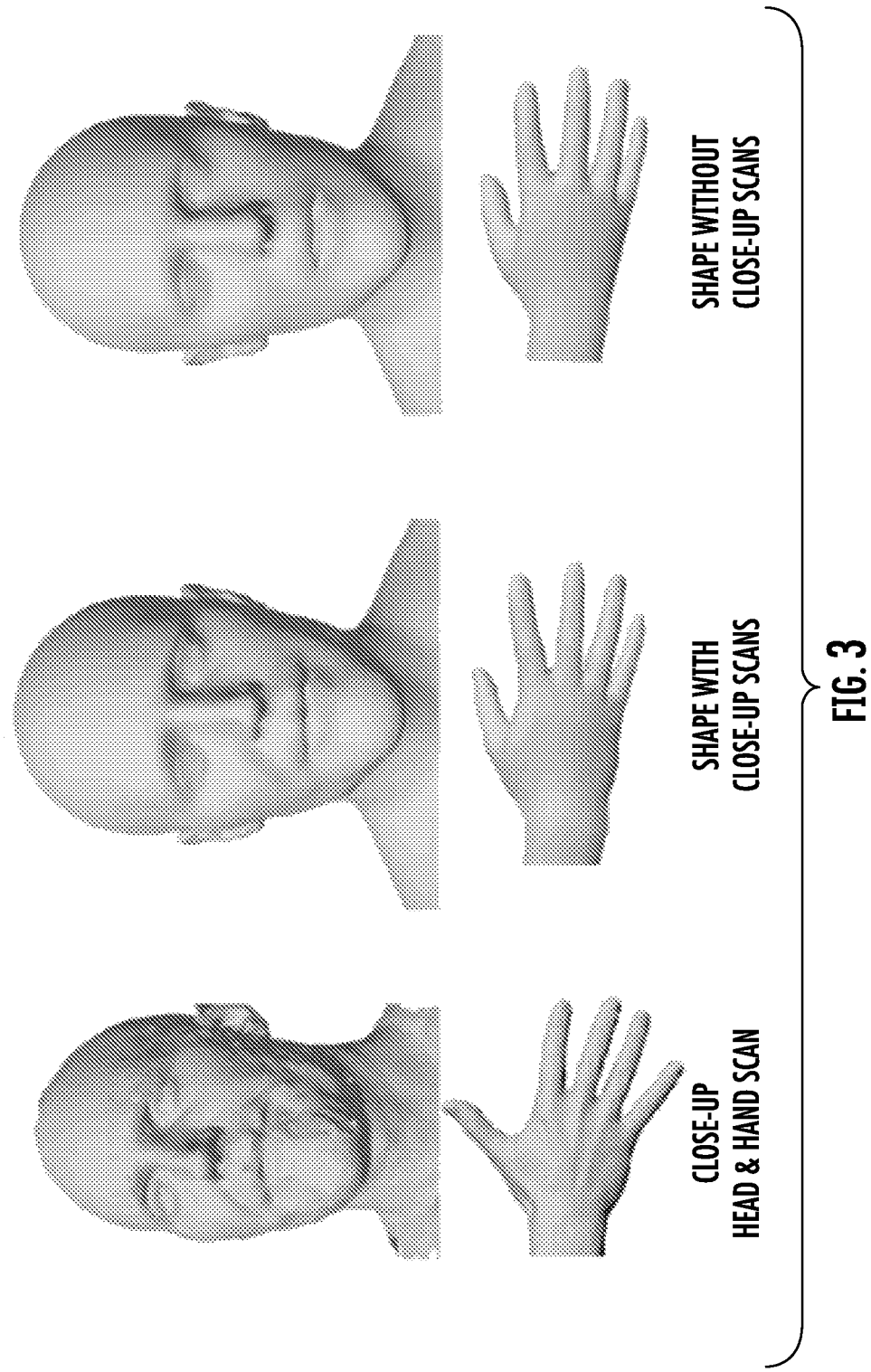
FIG. 3 depicts close up head and hand scans according to example embodiments of the present disclosure.

In some implementations, during training, all high-resolution scans of the same subjects (both full-body and closeups for face and hands) can be used (c.f. FIG. 3), with residuals appropriately masked by a filter F. For model construction, N captured subjects can be used, with B full body scans, F closeup hand scans, and H closeup head scans. In some implementations, during learning, the training algorithm can alternate between minimizing the loss function w.r.t. pose estimates in each scan $\theta$, and optimizing it with respect to the other model parameters ($\phi$, $\gamma$, $\psi$, $\omega$).

In operation, for pose and shape estimation, the model can be controlled by parameters $\alpha=(\theta, \beta)$, including kinematic pose $\theta$ and VAE latent spaces for body shape and facial expressions $\beta=(\beta^f, \beta^b)$, with encoder-decoders given by $\phi=(\phi^f, \phi^b)$.

2.1 Example Human Model Representation

Example implementations of the present disclosure can represent the human model as an articulated mesh, specified by a skeleton K with J joints and the skin deformed with Linear Blending Skinning (LBS) to explicitly encode the motion of joints. In addition to the skeletal articulation motion, nonlinear models can be used to drive facial expressions. A model X with J joints can be formulated as $M(\alpha=(\theta, \beta), \phi, \gamma, \omega)$, or in detail, as $$X(\alpha)=M(\theta,\tilde{X}(\beta),\Delta\tilde{X}(\theta),\Delta\tilde{X}^f(\beta^f),C(\overline{X}),\omega) \quad (1)$$

where $\tilde{X}(\beta) \in \mathbb{R}^{3V}$ is the identity-based rest shape in 'A' pose (see FIG. 2), with $\beta$ a low-dimensional rest shape embedding vector encoding body shape variability (different low-dimensional representations including PCA or VAEs can be used); similarly, $\Delta\tilde{X}^f (\beta^f)$, is the facial expression at neutral head pose controlled with low-dimensional facial expression embedding $\beta^f$; $c=C(\psi) \in \mathbb{R}^{3J}$ are the skeletal joint centers dependent on the body shape; $\theta \in \mathbb{R}^{3 \times (J+1)}$ is a vector of skeleton pose parameters consisting of (up to) 3 rotational DOFs in Euler angles for each joint and 3 translational variables at the root; $\omega \in \mathbb{R}^{V \times 1}$ are per-vertex skinning weights (e.g., which may in some implementations be influenced by at most some number of joints (e.g., I=4)); and lastly pose-dependent corrective blend shapes $\Delta\tilde{X}(\theta)$ are added to the rest shape to fix skinning artifacts.

Two example implementations of the proposed human models which are referred to herein as GHUM and GHUML are generated using artist-defined rigged template meshes ($V_{ghum}=10{,}168$, $V_{ghuml}=2852$, J=63), respectively. For both GHUM and GHUML, the pipeline illustrated in FIG. 2 estimated all the parameters ($\theta$, $\phi$, $\gamma$, $\psi$, $\omega$) while the mesh topology and the joint hierarchy K are considered fixed. The hierarchy is anatomically (hence minimally) parameterized so that bio-mechanical joint angle limits can also be leveraged during optimization. Vertices $x_i \in X$ can be written $$x_i = \sum_{j=1}^{J} \omega_{i,j} T_j(\theta, c) T_j(\overline{\theta}, c)^{-1} \begin{bmatrix} \tilde{x}_i + \Delta\tilde{x}_i + \Delta\tilde{x}_i^f \\ 1 \end{bmatrix} \quad (2)$$

$$T_j(\theta, c) = \prod_{a \in K(j)} \begin{bmatrix} R_a(\theta_a) & c_a \\ 0 & 1 \end{bmatrix} \in SE(3), \quad (3)$$

where $T_j(\theta, c)$ is the world transformation matrix for joint j, integrated by traversing the kinematic chain from the root to j. The transformation from the rest to the posed mesh can be constructed by multiplying by the inverse of world transformation matrix at rest pose $\overline{\theta}$.

3. Example End-to-End Statistical Model Learning

This section provides description of an example end-to-end neural network-based pipeline that optimizes the skinning weights $\omega$, and learns a rest shape embedding $\tilde{X}(\beta^b)$, a facial expression embedding $\tilde{X}^f$ ($\beta^f$), identity shape-dependent joint centers $c(\beta)$, and pose-dependent blend shapes $\overline{X}^p$ ($\theta$) from multi-subject, multi-pose registered surface meshes $X^*$ to full body and close-up face and hand scans (see FIG. 2). As a result of ICP registration, some example reconstruction losses can be formulated using per-vertex Euclidean distance error under one-to-one correspondences as $$L_r(X^*, X(\alpha)) = \frac{1}{V} \sum_{i=1}^{V} \|F_i(x_i - x_i^*)\|, \quad (4)$$

where F is a filter that accounts for different types of data (e.g., full body scans as opposed to closeups). In some implementations, in order to construct $X(\alpha)$, the pose $\theta$ can be co-estimated jointly with the statistical shape parameters. As one example, block coordinate descent can be performed, including alternating between estimation of pose parameters $\theta$ under the current shape parameters, based on a BFGS layer, and updating the other model parameters with $\theta$ fixed. As one example, skinning can be initialized from artist-provided defaults, all other parameters to 0. Each submodule can update the parameters $\alpha$ based on the global loss (4).

3.1 Example Variational Body Shape Autoencoder

In some example implementations, the multi-subject shape scans can be obtained by registering the models to the Caesar dataset (4,329 subjects) as well as captured scans in GHS3D, in resting or neutral 'A'-pose. As one example, FIG. 3 illustrates close ups of head and face scans. Some example implementations estimate the full body shape at a neural A pose by fusing the body scan and the closeup hand and head scans. Compared with body shape estimation from a single body scan, these example implementations can take advantage of additional head and hand shape detail.

Given rest shapes $\overline{X}$ estimated for multiple subjects, a compact latent space can be built for the body shape variation. As one example, instead of simply building a PCA subspace, the body shapes can be represented using a deep nonlinear variational autoencoder with a lower-dimensional latent subspace. Because in some implementations mesh articulation is estimated, the input scans $\overline{X}$ to the autoencoder(s) are all well aligned at 'A' pose without significant perturbation from rigid transformations and pose articulations.

In some example implementations, the encoder and decoder can use parametric ReLU activation functions, as they can model either an identity transformation or a standard ReLU, for certain parameters. As standard practice, the variational encoder can output a mean and a variance ($\mu$, $\Sigma$), which can be transformed to the latent space through the re-parametrization trick, in order to obtain the sampled code $\beta^b$. In some implementations, a simple distribution, $\mathcal{N}(0, I)$ can be used and the Kullback-Leibler divergence can be integrated in the loss function to regularize the latent space. Thus, one example formulation is as follows:

$$\tilde{X}(\beta^b) = \frac{1}{NB}\sum_1^{NB}\bar{X} + S_D(\beta^b) \tag{5}$$

$$\beta^b = S_E\left(\bar{X} - \frac{1}{NB}\sum_1^{NB}\bar{X}\right) \tag{6}$$

where the encoder $S_E$ captures the variance from the mean body shape into the latent vector $\beta^b$ and the decoder $S_D$ builds up the rest shape from $\beta^b$ to match the input target rest shape. In particular, some example implementations initialize the first and last layer of the encoder and decoder, respectively, to the PCA subspace $U \in \mathbb{R}^{3V \times L}$ where L is the dimensionality of the latent space. All other fully-connected layers can be initialized to identity, including the PReLU units. In some example implementations, the sub-matrix of log-variance entries can be initialized to 0, and the bias can be set to a sufficiently large negative value. In this way, the network will effectively initialize from the linear model, while keeping additional parameters to a minimum, e.g., as compared to PCA.

3.2 Example Variational Facial Expression Autoencoder

The variational body shape autoencoder can represent various body shapes, including the variances of face shapes. To additionally support complex facial expressions (as opposed to just anthropometric head and face rest variations) additional facial modeling can optionally be introduced. For example, the model can be built from thousands of facial expression motion sequence scans in GHS3D. In addition to a 3-DOF articulated jaw, two 2-DOFs eyelids and two 2-DOFs eyeballs, the parameters of the articulated joints on the head, including skinning weights and pose space deformation, can be updated together with the rest of the pipeline.

For facial motion that is due to expression not articulation, a nonlinear embedding $\beta^f$ can be built within the same network structure as the variational body shape autoencoder. The input to the VAE can be a facial expression $\Delta \tilde{X}^f \in \mathbb{R}^{3V^f}$ ($V^f$=1,932 for GHUM and 585 for GHUML) at neutral head pose by removing all articulated joint motion (including neck, head, eyes and jaw). In some implementations, to un-pose the registered head mesh to neutral, the articulated joint motion θ for the neutral head shape (without expression) that matches the registration can be fit as much as possible (4). The displacement field between the posed head and the registration is accounted to facial expressions and before the comparison the effect of articulated joints θ can be undone (unposed).

3.3 Example Skinning Model

After applying nonlinear shape and facial expression models, an optimal skinning function can be estimated statistically from multi-subject and multi-pose mesh data. Specifically, the same date term as in (4) can be used but now the optimization variables can be the parameters of the joint center estimator C(ψ), C:$\tilde{X}$→K, pose-dependent corrections to body shape D (θ, γ), and/or skinning weights ω.

One possible choice for skeletonal joint centers is to place them at average positions on the ring of boundary vertices connecting two mesh components (segmentations) maximally influenced by a joint. The average of boundary vertices, $\overline{C}\tilde{X} \in \mathbb{R}^{3J}$, imposes that the skeleton lies in the convex hull of the mesh surface, to adapt the centers to different body proportions. However, for better skinning, the estimate $\overline{C}$ can be kept but a linear regressor $\Delta C: \mathbb{R}^{3V} \to \mathbb{R}^{3J}$ can be built on top to learn joint center corrections from the body shape $$c(\tilde{X}) = \overline{C}\tilde{X} + \Delta C \tilde{X} \tag{7}$$

In some implementations, instead of learning joint centers globally by pooling over all mesh vertices, estimation can be performed only locally from those vertices skinned by the joint. This leads to considerably fewer trainable parameters going down from 3N×3J to 3N×3I, with e.g., I=4 in practice. Sparsity can also be encouraged through $L_1$ regularization, and also alignment of the bone directions to the template. To avoid singularities and prevent joint centers from moving outside the surface, the magnitude of center corrections $\|\Delta C\tilde{X}\|_2$ can be regularized.

In some implementations, to fix skinning artifacts as a result of complex soft tissue deformation, a data-driven pose-dependent corrector (PSD) $\Delta \tilde{X}(\theta)$ can be learned and applied to the rest shape. A nonlinear mapping $D:R_i(\theta_i)-R_i(\overline{\theta}_i) \in \mathbb{R}^{9J} \to \Delta \tilde{X}(\theta) \in \mathbb{R}^{3n}$ can be estimated. However, pose space corrections on a mesh vertex should intuitively be sourced from neighboring joints. Therefore, some example implementations can use a fully-connected ReLU activated layer to extract a much more compact feature vector (e.g., 32 units) than the input, from which the pose space deformation can be linearly regressed.

Figure 5:
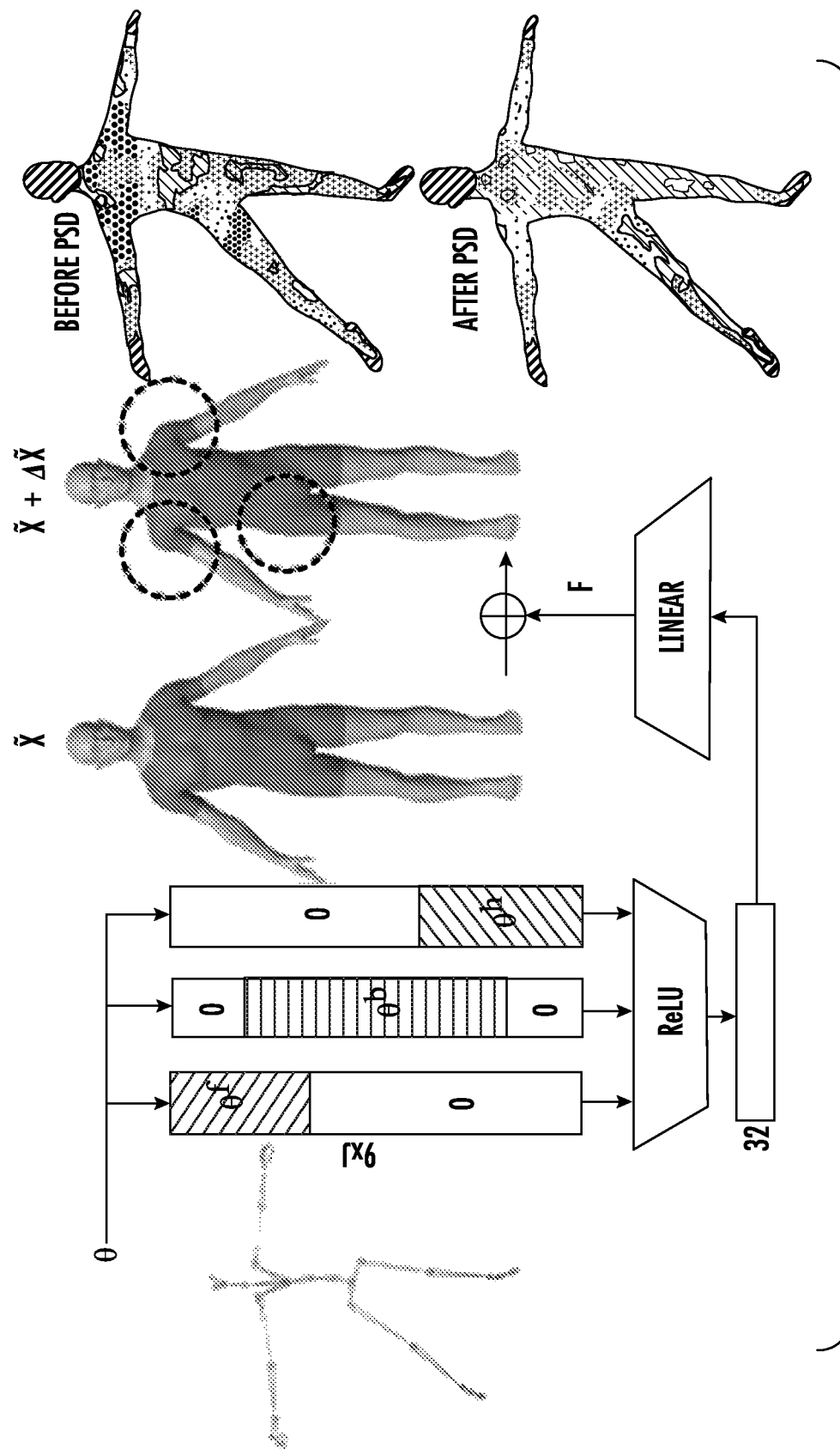
FIG. 5 depicts a block diagram of an example pose space deformation model according to example embodiments of the present disclosure.

As one example, FIG. 5 shows an example Pose Space Deformation architecture sketch and illustration showing the benefit of PSD, here around non-passive articulation points, e.g. right hip and thigh, as well as chest and armpits. For simplicity of illustration, here θ is used as the input feature instead of $R_i(\theta_i)-R_i(\overline{\theta}_i)$.

Moreover, in some instances $\tilde{X}(\theta)$ is sparse, and a joint can only generate local deformation correctives to its skinned mesh patch. Compared to the dense linear regressor in SMPL, the proposed network produces similar quality deformations with considerably fewer trainable parameters. The system can regularize the magnitude of pose space deformation to be small, preventing matching the targets by over-fitting through PSD corrections. This can be implemented by a simple $L_2$ penalty as $$L_p(\Delta \tilde{X}) = \|\Delta \tilde{X}(\theta)\|^2. \tag{8}$$

High-frequency local PSD is often undesirable and most likely due to overfitting. Therefore smooth pose space deformations can be encouraged with $$L_s(\Delta \tilde{X}) = \sum_{i=1}^V \sum_{j \in N(i)} \|l_{i,j}(\Delta \tilde{x}_i - \Delta \tilde{x}_j)\|^2, \tag{9}$$

where N(i) are the neighboring vertices to vertex i and $l_{i,j}$ are cotangent-based Laplacian weights.

Even with PSD regularizers and a reduced number of trainable weights, overfitting could still occur. Differently from SMPL or MANO, where pose space deformation were built specifically for only certain regions (body or hand), a PSD model is in some implementations of the present disclosure constructed for the entire human model, trained jointly based on high-resolution body, hand and head data closeups. Consequently the body data has limited variation on hand and head motions, whereas head and hand data has no motion for the rest of the body. Hence, there is a large articulation space where all joints can move without an effect on the loss. This is undesirable. To prevent overfitting, the input pose feature vector can be filtered or masked into 4 feature vectors, taking head, body, left hand and right hand joints. Each feature vector can be taken into the same ReLU layer and the outputs can be summed before the next regressor. Thus, one example loss is as follows:

$$L_F(\Delta \tilde{X}) = \|F\Delta \tilde{X} - \Delta \tilde{X}\|^2, \quad (10)$$

which enforces PSDs outside masked regions to be small, thus biasing the correctives produced by the network towards limited global impact. However, deformations of shared surface regions corresponding to areas between the head, hand, and the rest of the body, are learnt from all relevant data.

In some implementations, to estimate skinning weights, at the end of the pipeline, a linear blending skinning layer can be used which, given poses $\theta$ and pose-corrected rest shape with facial expression $\tilde{X}+\Delta\tilde{X}+\Delta\tilde{X}^f$, outputs a posed mesh (2) controlled by trainable skinning weight parameters $\omega$. Each skinned vertex can optionally be maximally influenced by some number (e.g., I=4) joints in the template. The system can then regularize $\omega$ to be close to the initial artist painted values $\bar{\omega}$, to be spatially smooth, and/or per-vertex skinning weights to be non-negative and normalized $$L_\omega^s(\omega) = \sum_{i=1}^{V} \sum_{j \in N(i)} \sum_{k=1}^{I} \|l_{i,j}(\omega_{i,k} - \omega_{j,k})\|^2 \quad (11)$$

$$L_\omega^i(\omega) = \sum_{i=1}^{V} \sum_{k=1}^{I} \|l_{i,j}(\omega_{i,k} - \bar{\omega}_{i,k})\|^2$$

$$\text{s.t.} \sum_{k=1}^{I} \omega_{i,k} = 1, \omega_{i,k} \geq 0.$$

The final skinned mesh X can also be weakly regularized to be smooth by adding $$L_m(X) = \sum_{i=1}^{V} \sum_{j \in N(i)} \|l_{i,j}(x_i - x_j)\|^2. \quad (12)$$

Pose Estimator. Given body shape estimates and current skinning parameters, the poses $\theta$ can be reoptimized over the training set. To limit the search space, enforce consistency, and avoid unnatural local minimums, the anatomical joint angle limits available with the anthropometric skeleton can be leveraged. The problem can be efficiently solved using an L-BFGS solver with box constraints, and gradients evaluated by TensorFlow's automatic differentiation.

4. Example Experiments

This section describes example experiments conducted on example implementations of the systems and methods described herein.

Datasets. In addition to Caesar, which contains diverse body and face shapes (4,329 subjects), the example experiments described herein also used multiple 3dmd systems operating at 60 Hz to capture 32 subjects (16 females and 16 males) with 55 body poses, 60 hand poses and 40 motion sequences of facial expressions. The subjects have a BMI range from 17.5 to 39, height from 152 cm to 192 cm and are aged from 22 to 47. For all multi-pose data, we use 3 subjects for evaluation, and 4 subjects for testing, based on a freestyle motion sequence containing poses generally not in the training set. Each face capture sequence starts from a neutral face to a designated facial expression and each sequence lasts about 2s.

Figure 6:
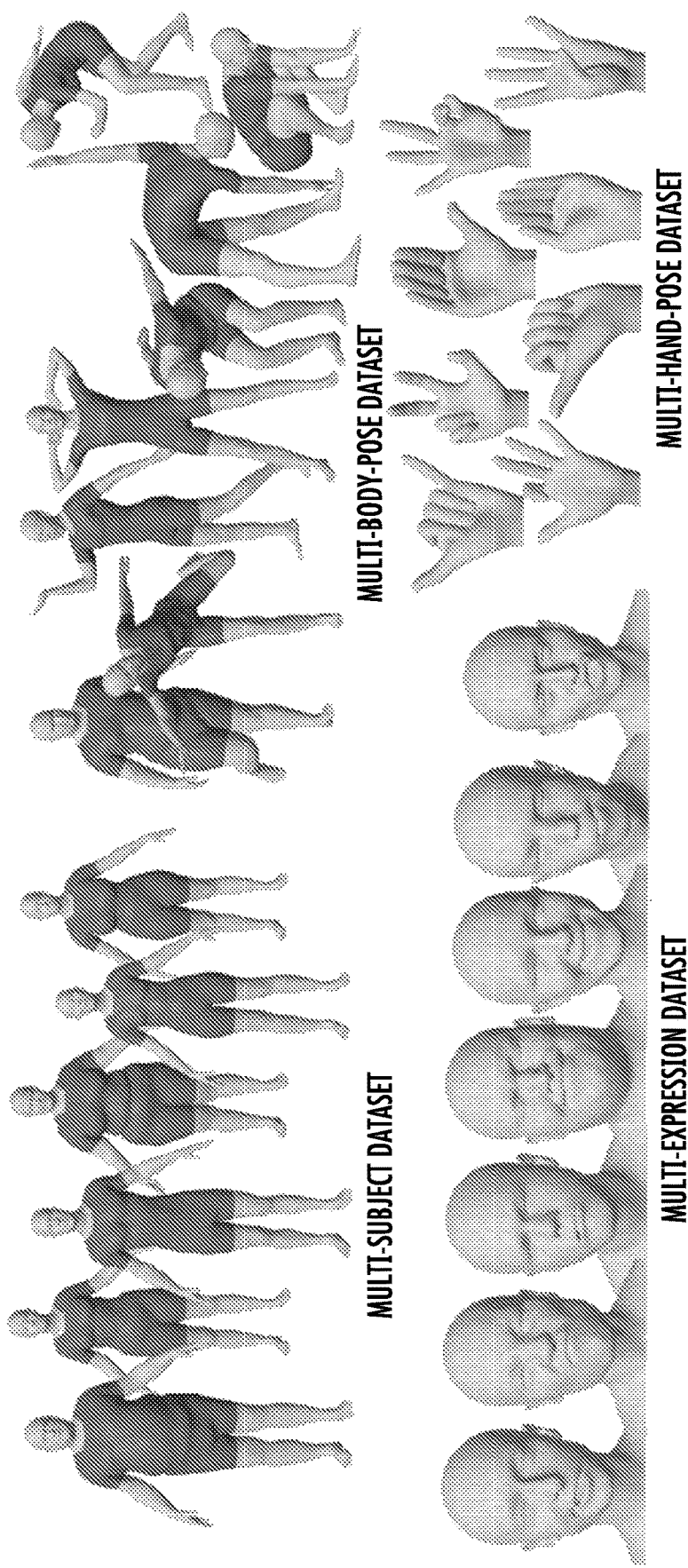
FIG. 6 depicts example evaluations of example human shape models according to example embodiments of the present disclosure.

Registration samples from the data are shown in FIG. 6. Specifically, FIG. 6 shows sample registrations for data from Caesar (top left) as well as GHS3D. Notice the quality of registration that captures facial detail and soft tissue deformation of the other body parts as a result of articulation.

Registration. Table 1 reports registration to the point clouds using ICP and the (extended) Chamfer distance. ICP error is measured as point-to-plane distance to the nearest registered mesh facet, whereas Chamfer is estimated point to point, bidirectionally.

TABLE 1

Registration error on Caesar and GHS3D (with detail for faces, hands, and the rest of the body) for GHUM and GHUML.

| Dataset | ICP error (mm) | | Chamfer distance (mm) | |
|---|---|---|---|---|
| | GHUM | GHUML | GHUM | GHUML |
| Caesar | 0.265 | 0.465 | 19.13 | 31.84 |
| body | 0.371 | 0.725 | 20.76 | 33.64 |
| head | 0.442 | 0.519 | 10.12 | 12.38 |
| hand | 0.164 | 0.423 | 14.88 | 22.01 |

The proposed registration technique has low error and preserves local point cloud detail (FIG. 6).

Figure 4:
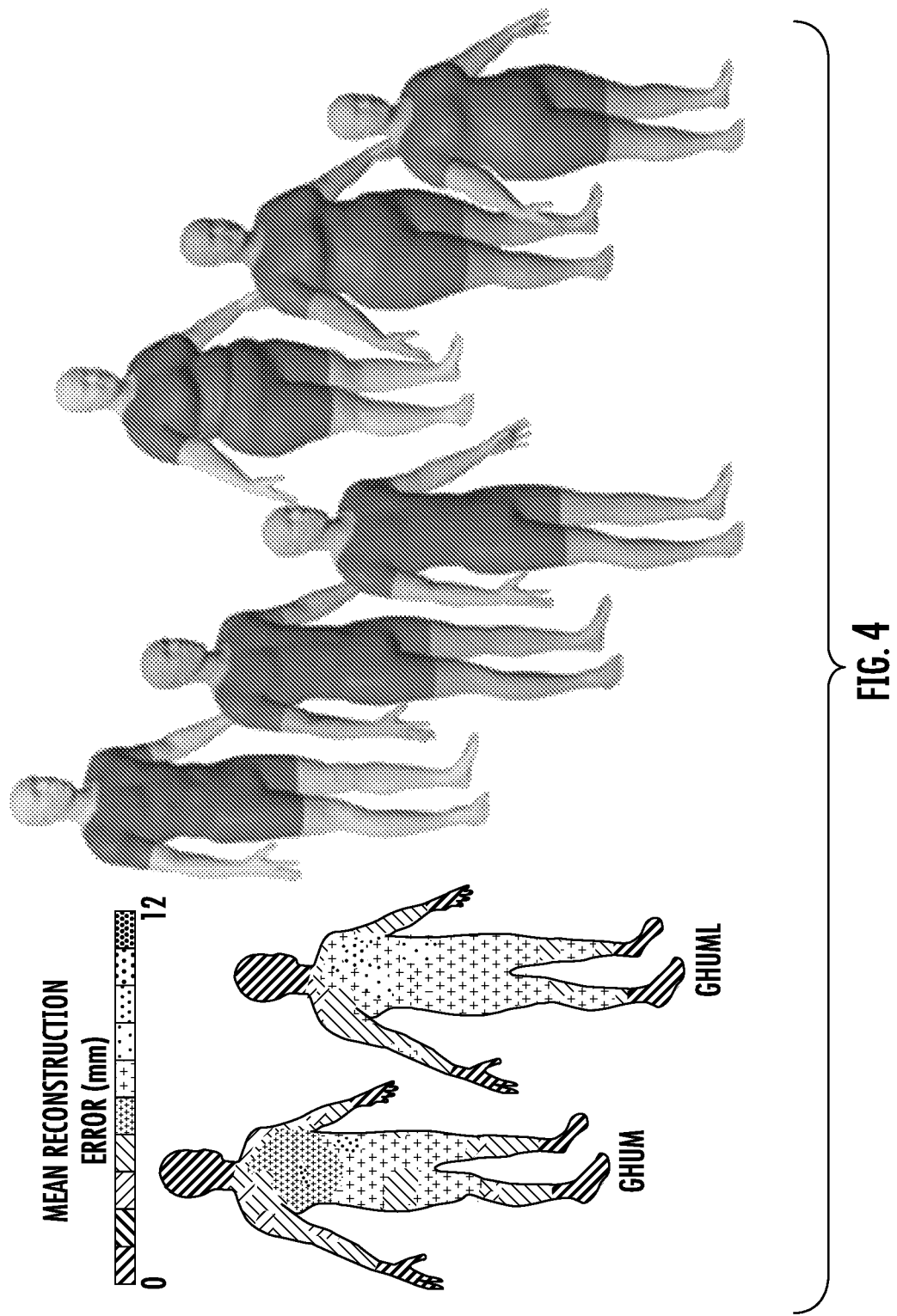
FIG. 4 depicts example evaluations of example human shape models according to example embodiments of the present disclosure.
Figure 9:
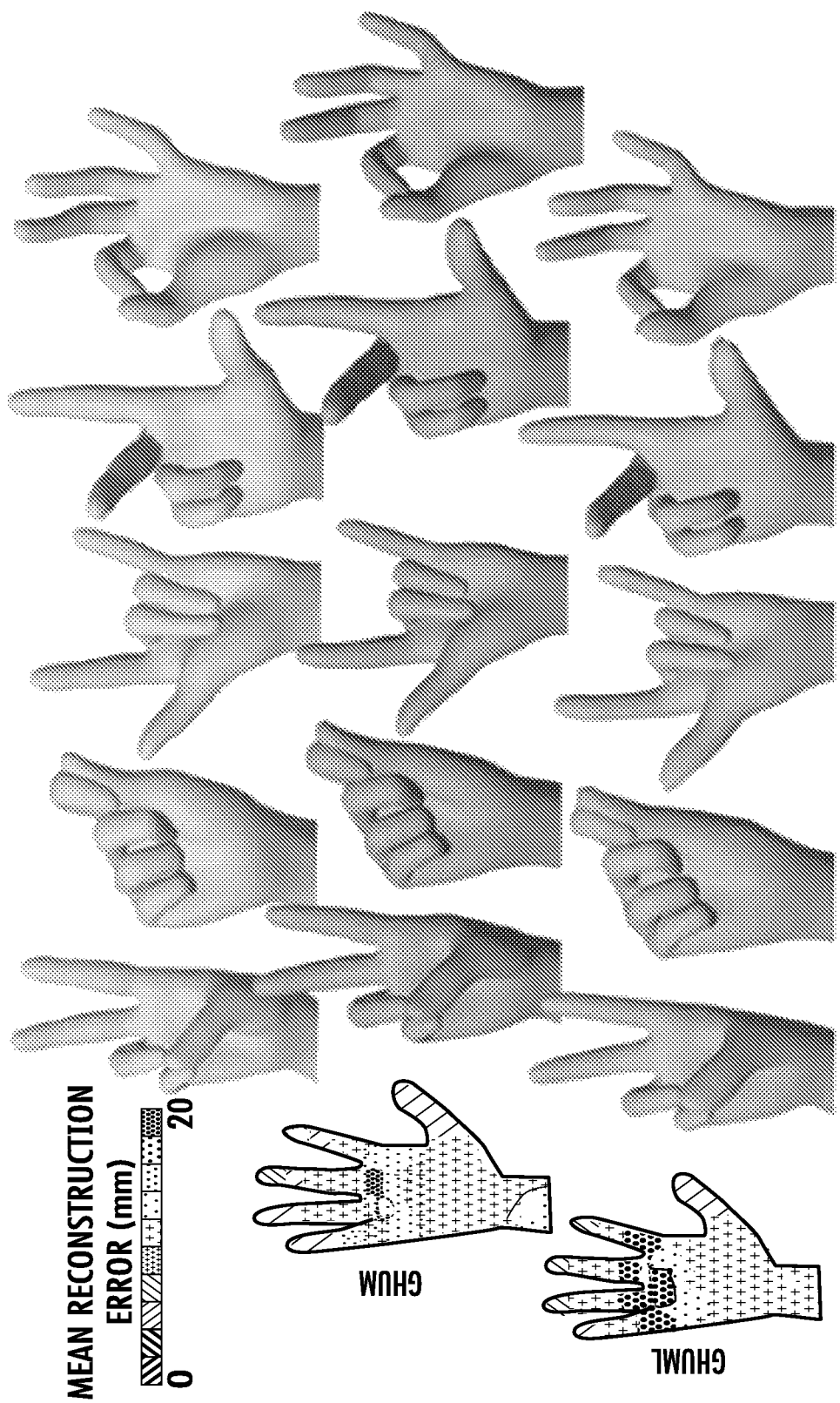
FIG. 9 depicts example evaluations of example human shape models according to example embodiments of the present disclosure.

Model Evaluation. Both a full resolution and a low-resolution human model (GHUM and GHUML) were built using our end-to-end pipeline. Both models share the same set of skeleton joints but have 10,168 vs. 2,852 mesh vertices (with 1,932 vs. 585 vertices for facial expressions). For both models, the example experiments evaluated the mean vertex-based Euclidean distances of meshes X to registrations X* on testing data. Numbers are reported in Table 2 and visualizations are shown in FIGS. 4, 1, and 9 (please find hand evaluations in Sup. Mat). We compare the outputs of both models to registered meshes under their corresponding topology. Both models can closely represent a diversity of body shapes (e.g., modeled as VAEs), produce natural facial expressions (e.g., represented as facial VAEs) and pose smoothly and naturally without noticeable skinning artifacts for a variety of body shapes and poses (e.g., resulting from optimized skinning parameters).

TABLE 2

Mean vertex-based Euclidean error for registration (mm).

| Dataset | Caesar | GHS3D → body | face | hand |
|---|---|---|---|---|
| GHUM | 1.96 | 5.26 | 1.64 | 2.96 |
| GHUML | 2.04 | 5.15 | 2.29 | 4.76 |

GHUM vs GHUML. The low resolution model preserves the global features of the body shape and correctly skins the body and facial motion. Compared with GHUM, it can be observed that GHUML loses some detail for lip deformations, muscle bulges at the arms and fingers, and wrinkles due to fat tissue. Performance-wise, GHUML is 2.5× faster, in feed-forward evaluation mode, than GHUM.

FIG. 4 shows evaluation on Caesar. The left side of FIG. 4 shows per-vertex Euclidean distance error to the registration for GHUM and GHUML. The right side of FIG. 4 shows, from top to bottom, registrations, GHUM, and GHUML. VAE-based models can represent body shape very well. Compared to GHUML, additional muscle or waist soft tissue detail is preserved by GHUM.

FIG. 9 shows evaluation and rendering as in FIG. 1 with emphasis on the hand reconstruction of GHUM and GHUML. Similar conclusions as in FIG. 1 hold. Notice additional deformation details around the flexion region of the palm preserved by GHUM over GHUML.

VAE Evaluation. For body shape, the proposed VAE supports both a 16-dim and a 64-dim latent representation where the former has 1.72× higher reconstruction error (report in Table 2 and figures is based on a 64-dim representation). In some examples, a 20-dim embedding can be used for the facial expression VAE.

Figure 7:
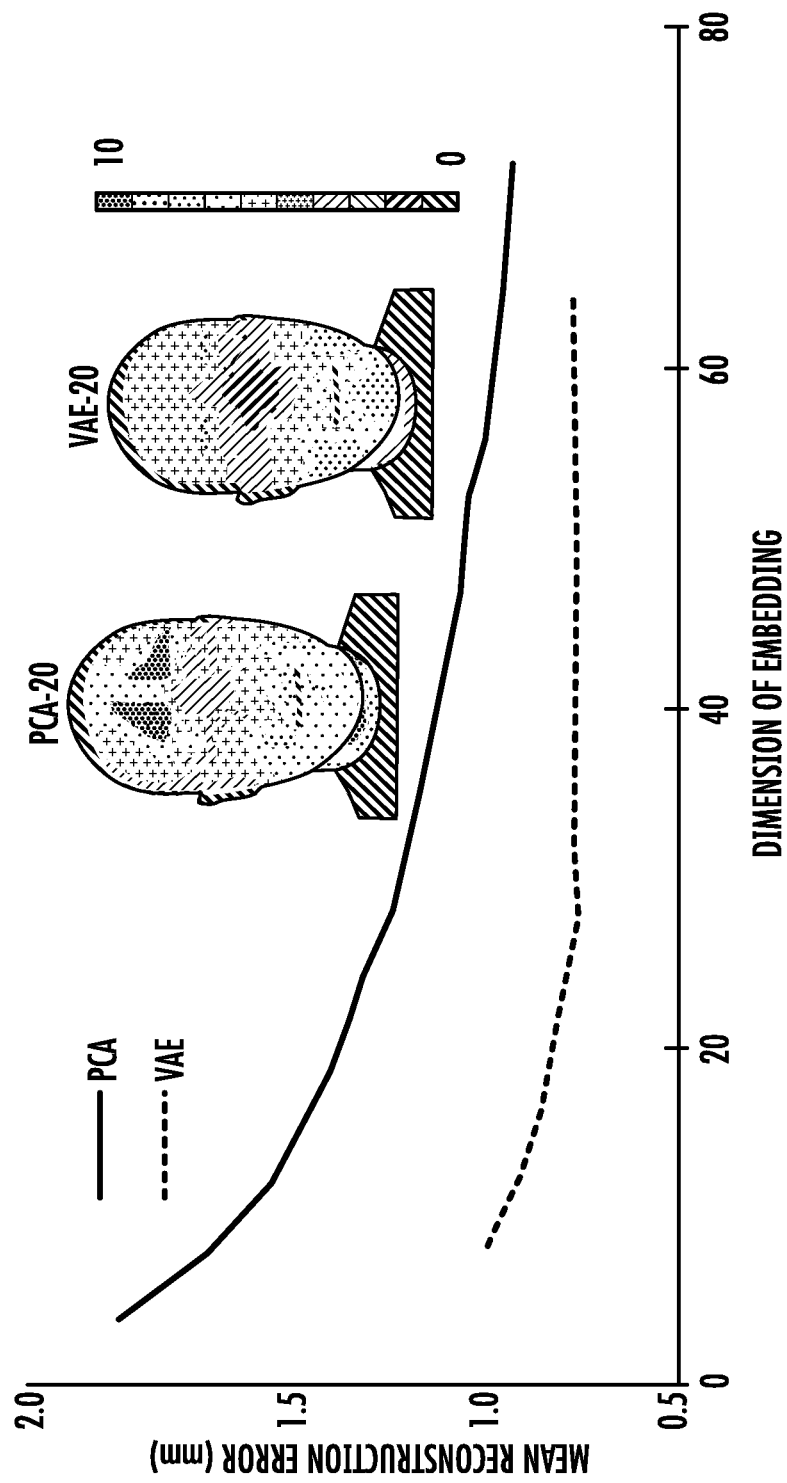
FIG. 7 depicts an example analysis of encoding techniques according to example embodiments of the present disclosure.

FIG. 7 shows the reconstruction error of facial expressions as a function of the latent dimension, for both VAE and PCA. The 20-dimensional VAE has a reconstruction error similar to the one that uses 96 linear PCA basis, at the cost of 2.9× slower performance. Specifically, FIG. 7 shows an analysis of VAE and PCA models which illustrates the advantages of non-linearity in the low-dimensional regime.

Figure 8:
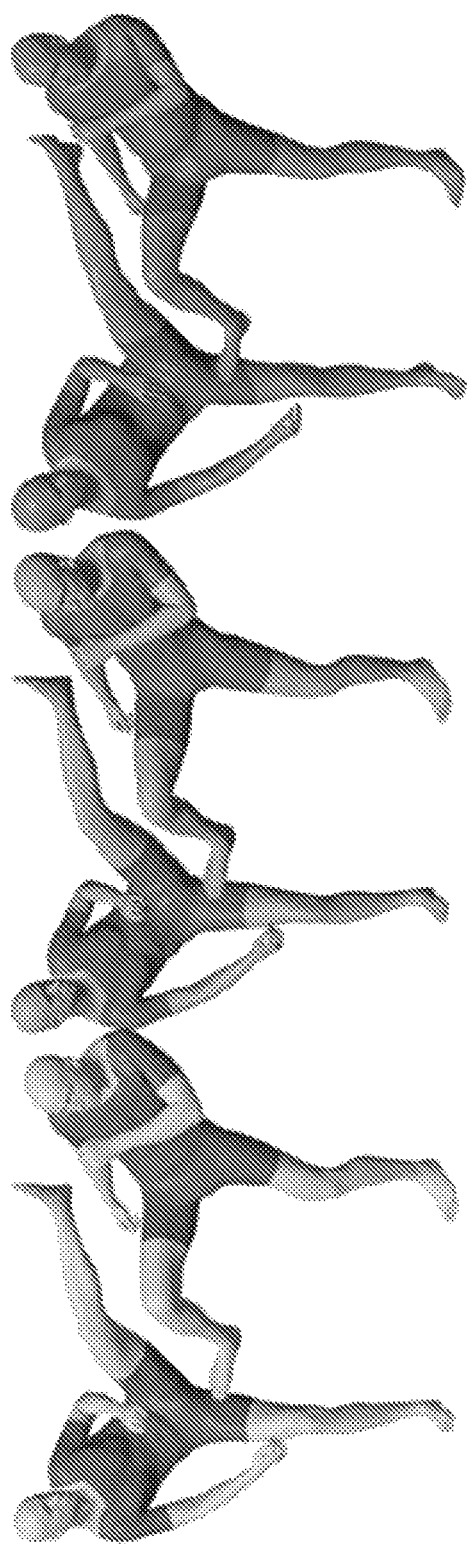
FIG. 8 depicts example evaluations of example human shape models according to example embodiments of the present disclosure.

GHUM vs SMPL. In FIG. 8, GHUM and SMPL are compared for visual quality. In particular, FIG. 8 shows, from left to right, registration, GHUM, and SMPL for each of two poses. GHUM produces posing of comparable visual quality, albeit notice fewer pelvis artefacts for this motion sequence.

GHUM has different mesh and skeleton typologies from SMPL and SMPL does not have hand and facial joints. To compare, a captured motion sequence (all the poses, not in our training dataset) from GHS3D is taken, and the captured sequence is registered with SMPL and GHUM mesh respectively. When the error is evaluated, one-to-one point-to-plane Euclidean distance is used (e.g., to avoid sensitivity to surface sliding during registration), and the error is only evaluated on the body region for fair comparison with SMPL. The mean reconstruction error from GHUM is 4.4 mm whereas SMPL has 5.37 mm error, and visual skinning quality for GHUM is observed to be on par with SMPL.

Figure 10:
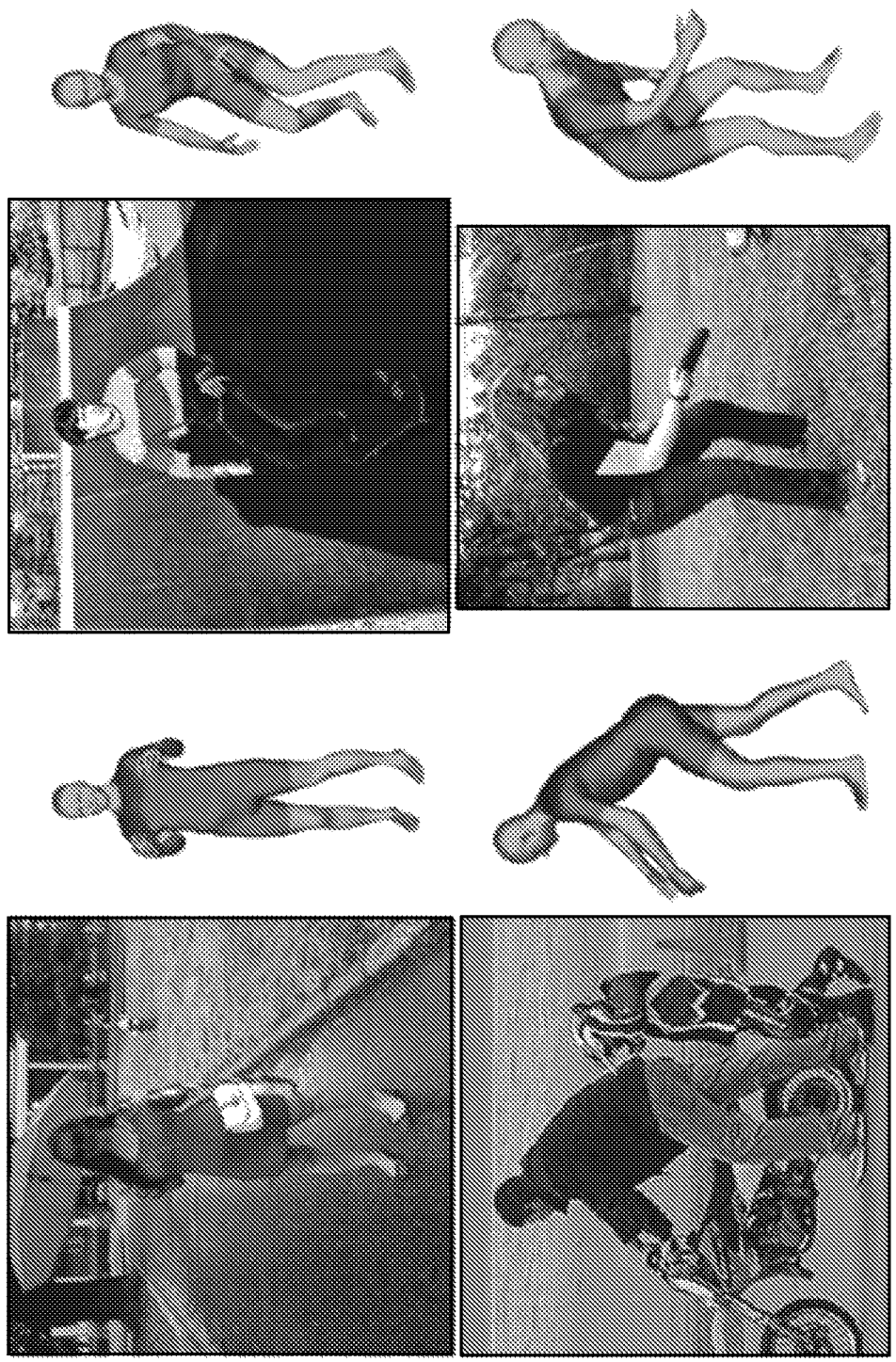
FIG. 10 depicts human pose and shape reconstruction from monocular images according to example embodiments of the present disclosure.

3D Pose and Shape Reconstruction from Monocular Images. This section illustrates image inference with GHUM. In this case, the kinematic prior of the model (for hands and the rest of the body, excluding the face) has been trained with data from Human3.6M, CMU, and GHS3D. An image predictor was not used for pose and shape. Instead, initialization was performed at 6 different kinematic configurations and α parameters were optimized under anatomical joint angle limits. As loss, the skeleton joints reprojection error and a semantic body-part alignment were used. The results are shown in FIG. 10. Specifically, FIG. 10 shows monocular 3D human pose and shape reconstruction with GHUM by relying on non-linear pose and shape optimization under a semantic body part alignment loss.

5. Example Devices and Systems

Figure 11A:
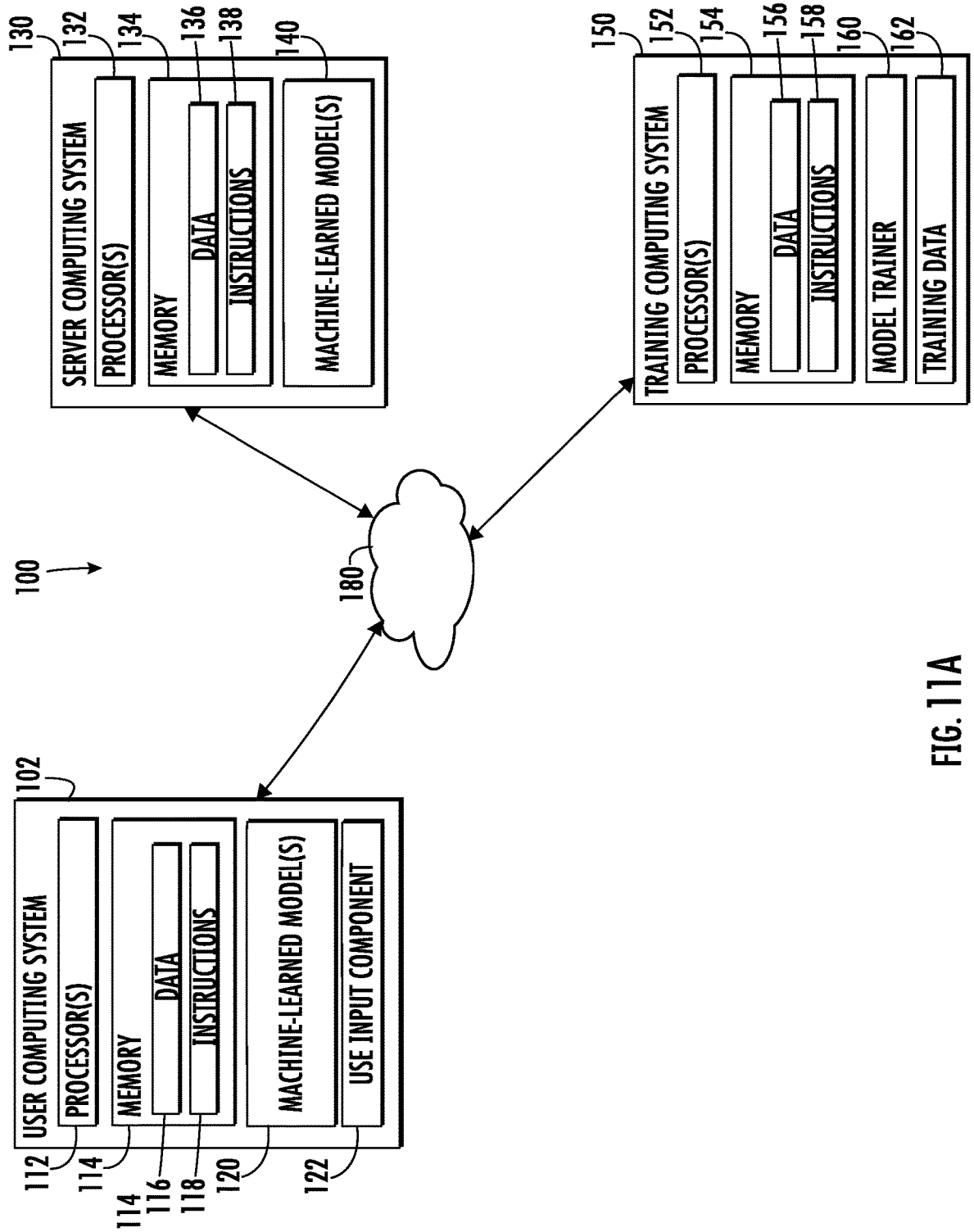
FIG. 11A depicts a block diagram of an example computing system according to example embodiments of the present disclosure.

FIG. 11A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIG. 2.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a body shape modeling and/or rendering service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 2.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, full body, hand, and/or facial scans and/or ground truth registrations of such scans.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 11A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 11B:
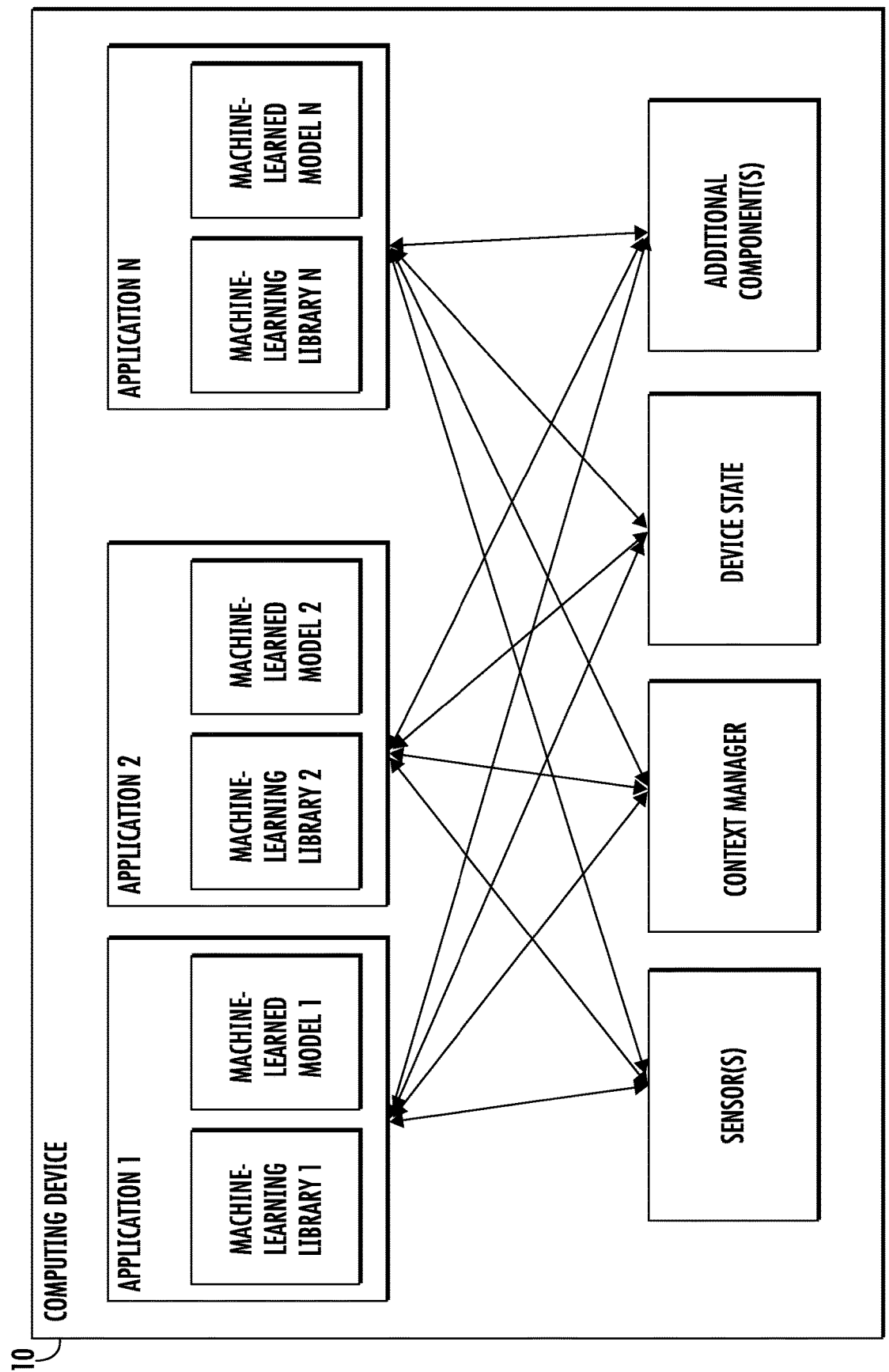
FIG. 11B depicts a block diagram of an example computing device according to example embodiments of the present disclosure.

FIG. 11B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 11B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 11C:
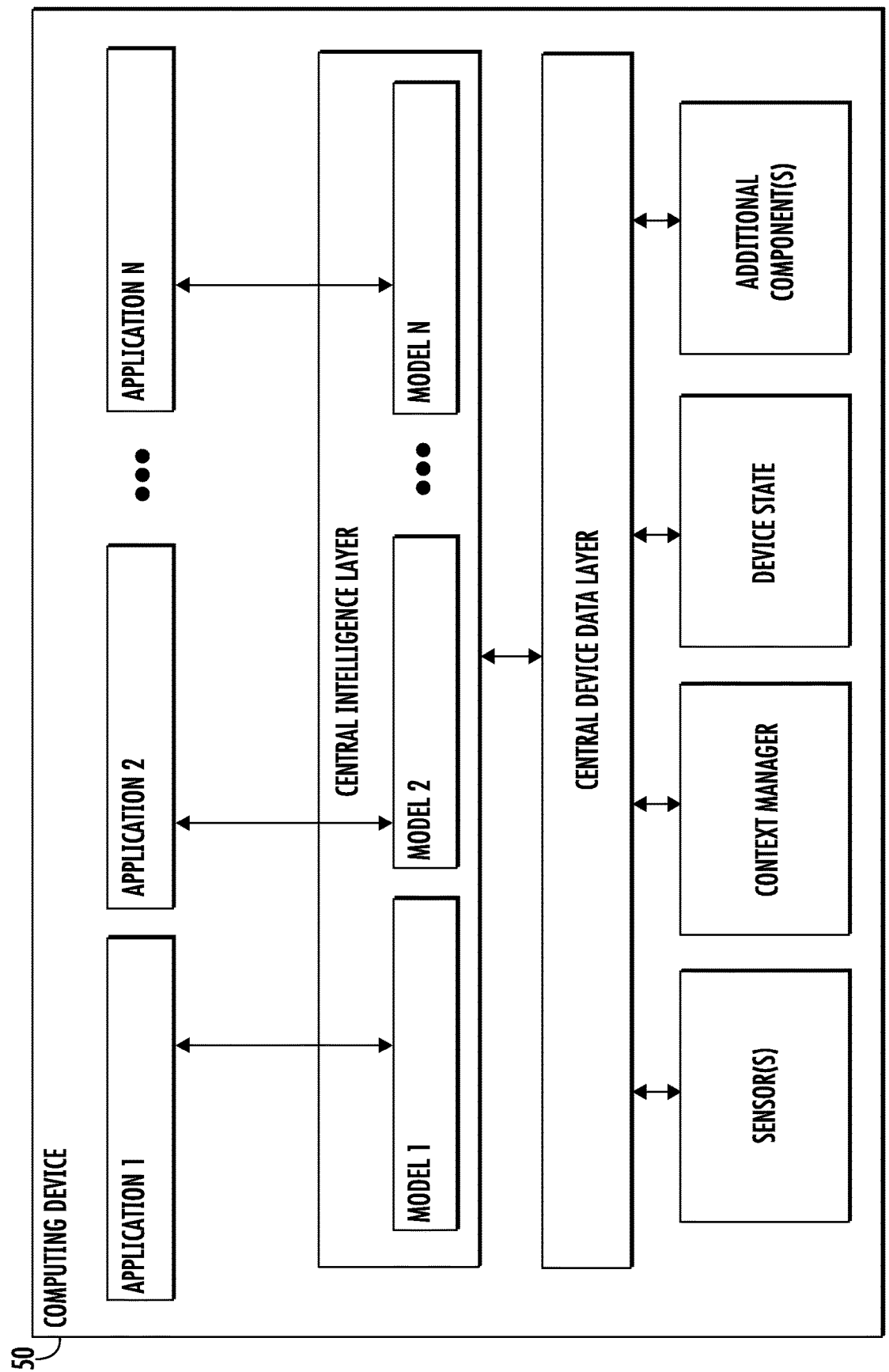
FIG. 11C depicts a block diagram of an example computing device according to example embodiments of the present disclosure.

FIG. 11C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 11C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 11C, the central device data layer can communicate with a number of other components of the computing device, such as, for example, one or more sensors, a context manager, a device state component, and/or additional components. In some implementations, the central device data layer can communicate with each device component using an API (e.g., a private API).

6. Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to jointly train a machine-learned three-dimensional human shape model in an end-to-end pipeline, the method comprising, for one or more training iterations:

obtaining, by a computing system comprising one or more computing devices, one or more ground truth registered shape scans of a training body, wherein the one or more ground truth registered shape scans of the training body comprise at least a ground truth registered full body scan with an arbitrary pose and a ground truth registered facial detail scan, and wherein the ground truth registered full body scan and the ground truth registered facial detail scan are separate from one another;

encoding, by the computing system using a shape encoder model, an estimated registered full body scan with a resting pose to obtain a rest shape embedding associated with the training body;

decoding, by the computing system using a shape decoder model, the rest shape embedding to obtain identity-based rest shape data for the training body;

encoding, by the computing system using a facial encoder model, data derived from the ground truth registered facial detail scan to obtain a facial expression embedding associated with the training body;

decoding, by the computing system using a facial decoder model, the facial expression embedding to obtain facial expression data for the training body;

generating, by the computing system, a training posed mesh for the training body based at least in part on the identity-based rest shape data, the facial expression data, and a set of pose parameters that correspond to the arbitrary pose;

evaluating a reconstructive loss function that compares the training posed mesh generated for the training body with the ground truth registered full body scan with the arbitrary pose and the ground truth registered facial detail scan, wherein the reconstructive loss function comprises a filter that indicates which vertices of the training posed mesh are compared to the ground truth registered full body scan with the arbitrary pose and which vertices of the training posed mesh are compared to the ground truth registered facial detail scan which is separate from the ground truth registered full body scan with the arbitrary pose;

jointly training the shape encoder model, the shape decoder model, the facial encoder model, and the facial decoder model based at least in part on the reconstructive loss; and providing the machine-learned three-dimensional human shape model comprising at least the shape decoder model and the facial decoder model.

2. The computer-implemented method of claim 1, wherein:

generating, by the computing system, the training posed mesh for the training body comprises processing, by the computing system using a pose space deformation model, the set of pose parameters to generate pose-dependent shape adjustments for the training body; and the pose space deformation model is jointly trained with the shape encoder model, the shape decoder model, the facial encoder model, and the facial decoder model based at least in part on the reconstructive loss.

3. The computer-implemented method of claim 2, wherein:

generating, by the computing system, the training posed mesh for the training body comprises:

processing, by the computing system using a joint centers prediction model, the identity-based rest shape data to generate a plurality of predicted joint centers for a plurality of joints of a skeleton representation of the training body; and processing, by the computing system using a blend skinning model, the facial expression data, the pose-dependent shape adjustments, the identity-based rest shape data, and the one or more predicted joint centers to generate the training posed mesh for the training body; and the joint centers prediction model and the blend skinning model are jointly trained with the shape encoder model, the shape decoder model, the facial encoder model, the facial decoder model, and the pose space deformation model based at least in part on the reconstructive loss.

4. The computer-implemented method of claim 3, wherein the blend skinning model comprises a linear blend skinning model that has a plurality of learned weights respectively for the plurality of joints.

5. The computer-implemented method of claim 1, wherein the one or more ground truth registered shape scans of the training body further comprise a ground truth registered hand detail scan, and wherein the reconstructive loss function evaluates a difference between the training posed mesh and the ground truth registered hand detail scan.

6. The computer-implemented method of claim 1, wherein said jointly training comprises alternating between (1) estimation of the set of pose parameters and (2) updating parameters of the shape encoder model, the shape decoder model, the facial encoder model, and the facial decoder model with the set of pose parameters fixed.

7. The computer-implemented method of claim 1, wherein the reconstructive loss function evaluates a per-vertex Euclidean distance error with one to one correspondences.

8. A computing system featuring a machine-learned three-dimensional human shape model with at least facial and body shape components jointly trained in an end-to-end pipeline, the computing system comprising:
one or more processors; and
one or more non-transitory computer-readable media that collectively store a machine-learned three-dimensional human shape model comprising:
a machine-learned facial expression decoder model trained to process a facial expression embedding associated with a human body to generate facial expression data for the human body;
a machine-learned pose space deformation model trained to process a set of pose parameters to generate pose-dependent shape adjustments for the human body; and
a machine-learned shape decoder model trained to process a rest shape embedding associated with the human body to generate identity-based rest shape data for the human body;
wherein the machine-learned three-dimensional human shape model has been trained to generate a posed mesh for the human body based at least in part on the facial expression data, the pose-dependent shape adjustments, and the identity-based rest shape data;
wherein all of the machine-learned facial expression decoder model, the machine-learned pose space deformation model, and the machine-learned shape decoder model have been jointly trained end-to-end based at least in part on a reconstructive loss function that compares a training posed mesh generated by the machine-learned three-dimensional human shape model for a training body with one or more ground truth registered shape scans of the training body;
wherein the one or more ground truth registered shape scans of the training body comprise a ground truth registered full body scan and a ground truth registered facial detail scan that is separate from the ground truth registered full body scan; and wherein the reconstructive loss function comprises a filter that indicates which vertices of the training posed mesh are compared to the ground truth registered full body scan with the arbitrary pose and which vertices of the training posed mesh are compared to the ground truth registered facial detail scan which is separate from the ground truth registered full body scan with the arbitrary pose.

9. The computing system of claim 8, wherein the machine-learned three-dimensional human shape model further comprises:
a machine-learned joint centers prediction model trained to process the identity-based rest shape data to generate a plurality of predicted joint centers for a plurality of joints of a skeleton representation of the human body; and
a machine-learned blend skinning model trained to process the facial expression data, the pose-dependent shape adjustments, the identity-based rest shape data, and the one or more predicted joint centers to generate the posed mesh for the human body;
wherein the machine-learned joint centers prediction model and the machine-learned blend skinning model have been jointly trained end-to-end with the machine-learned facial expression decoder model, the machine-learned pose space deformation model, and the machine-learned shape decoder model based at least in part on the reconstruction loss.

10. The computing system of claim 9, wherein the machine-learned blend skinning model comprises a linear blend skinning model that has a plurality of learned weights respectively for the plurality of joints.

11. The computing system of claim 8, wherein the one or more ground truth registered shape scans of the training body further comprise a ground truth registered hand detail scan that is separate from the ground truth registered full body scan and the ground truth registered facial detail scan.

12. The computing system of claim 8, wherein the machine-learned facial expression decoder model was trained as a portion of a facial expression variational autoencoder trained to receive a training head mesh, encode the training head mesh to generate the facial expression embedding, and process the facial expression embedding to generate the facial expression data for the human body.

13. The computing system of claim 8, wherein the machine-learned shape decoder model was trained as a portion of a shape variational autoencoder trained to receive training body rest shape mesh, encode the training body rest shape mesh to generate the rest shape embedding, and process the rest shape embedding to generate the identity-based rest shape data for the human body.

14. The computing system of claim 8, wherein the set of pose parameters comprises four feature vectors respectively for head, body, left hand, and right hand joints, and wherein the machine-learned pose space deformation model comprises a rectified linear unit layer configured to jointly receive the four feature vectors and output a single set of outputs.

15. The computing system of claim 8, wherein the machine-learned three-dimensional human shape model was trained by, for each of a plurality of training examples, alternating between (1) estimation of the set of pose parameters and (2) updating other parameters of the machine-learned three-dimensional human shape model with the set of pose parameters fixed.

16. The computing system of claim 8, wherein the reconstructive loss function evaluates a per-vertex Euclidean distance error with one to one correspondences.

17. The computing system of claim 8, wherein the one or more non-transitory computer-readable media further store instructions that, when executed by the one or more processors, cause the computing system to perform operations, the operations comprising:
obtaining a new facial expression embedding, a new set of pose parameters, and a new rest shape embedding associated with a new human body; and
generate a new posed mesh for the new human body based at least in part on the new facial expression embedding, the new set of pose parameters, and the new rest shape embedding.

18. The computing system of claim 17, wherein obtaining the new facial expression embedding, the new set of pose parameters, and the new rest shape embedding comprises:
generating the new facial expression embedding, the new set of pose parameters, and the new rest shape embedding from a monocular image that depicts the new human body.

19. One or more non-transitory computer-readable media that collectively store a machine-learned three-dimensional human shape model comprising:
a machine-learned facial expression decoder model trained to process a facial expression embedding associated with a human body to generate facial expression data for the human body; and
a machine-learned shape decoder model trained to process a shape embedding associated with the human body to generate identity-based shape data for the human body;
wherein the machine-learned three-dimensional human shape model is trained to generate a posed mesh for the human body based at least in part on the facial expression data, a set of pose parameters, and the identity-based shape data;
wherein the machine-learned facial expression decoder model and the machine-learned shape decoder model have been jointly trained end-to-end based at least in part on a reconstructive loss function that compares a training posed mesh generated by the machine-learned three-dimensional human shape model for a training body with one or more ground truth registered shape scans of the training body;
wherein the one or more ground truth registered shape scans of the training body comprise a ground truth registered full body scan and a ground truth registered facial detail scan that is separate from the ground truth registered full body scan; and
wherein the reconstructive loss function comprises a filter that indicates which vertices of the training posed mesh are compared to the ground truth registered full body scan with the arbitrary pose and which vertices of the training posed mesh are compared to the ground truth registered facial detail scan which is separate from the ground truth registered full body scan with the arbitrary pose.

20. A computer-implemented method to jointly train a machine-learned three-dimensional human shape model in an end-to-end pipeline, the method comprising, for one or more training iterations:
accessing, by the computing system, the machine-learned three-dimensional human shape model comprising one or more body models and one or both of: (i) one or more face models and (ii) one or more hand models;
obtaining, by the computing system comprising one or more computing devices, one or more ground truth registered shape scans of a training body, wherein the one or more ground truth registered shape scans of the training body comprise at least a ground truth registered full body scan with an arbitrary pose and one or both of: (i) a ground truth registered facial detail scan and (ii) a ground truth registered hand detail scan, and wherein the ground truth registered full body scan, the ground truth registered facial detail scan, and ground truth registered hand detail scan are separate from one another;
generating, by the computing system, a training posed mesh for the training body as an output of the machine-learned three-dimensional human shape model;
evaluating a reconstructive loss function that compares the training posed mesh generated for the training body by the machine-learned three-dimensional human shape model with the ground truth registered full body scan with the arbitrary pose and the one or both of the ground truth registered facial detail scan and the ground truth registered hand detail scan, wherein the reconstructive loss function comprises a filter that indicates which vertices of the training posed mesh are compared to the ground truth registered full body scan with the arbitrary pose and which vertices of the training posed mesh are compared to the one or both of the ground truth registered facial detail scan and the ground truth registered hand detail scan which are separate from the ground truth registered full body scan with the arbitrary pose;
jointly training, by the computing system, the one or more body models and the one or both of the one or more face models and the one or more hand models of the machine-learned three-dimensional human shape model based at least in part on the reconstructive loss; and
providing, by the computing system, the machine-learned three-dimensional human shape model as an output.

* * * * *